United States Patent [19]

Brockman et al.

[11] Patent Number: 5,223,072
[45] Date of Patent: Jun. 29, 1993

[54] INTELLIGENT SERVO-CONTROLLED FIBER PLACEMENT MACHINE TENSIONER

[75] Inventors: John P. Brockman; Robert A. Carman, both of Cincinnati; David C. Swope, North Bend; Norman D. Neal, Loveland; Harold D. Wiebe, Springdale, all of Ohio

[73] Assignee: Cincinnati Milacron, Inc., Cincinnati, Ohio

[21] Appl. No.: 705,498
[22] Filed: May 24, 1991
[51] Int. Cl.$^5$ .......................................... B65H 59/00
[52] U.S. Cl. ................................. 156/361; 156/425; 156/433; 156/523; 156/574; 242/75.44; 242/75.51
[58] Field of Search ............... 156/523, 574, 433, 425, 156/361; 242/75.43, 75.44, 75.51

[56] References Cited

U.S. PATENT DOCUMENTS

| | | |
|---|---|---|
| 4,344,582 | 8/1982 | Rapp et al. |
| 4,442,985 | 4/1984 | Kishi et al. .................. 242/75.51 X |
| 4,525,654 | 6/1985 | Tajima et al. ................ 242/75.51 X |
| 4,550,884 | 11/1985 | Permut et al. .................... 226/91 X |
| 4,623,101 | 11/1986 | Cacak . |
| 4,719,397 | 1/1988 | Kneifel et al. . |
| 4,799,981 | 6/1989 | Stone et al. ...................... 156/574 X |
| 4,877,193 | 10/1989 | Vaniglia .......................... 156/574 X |
| 5,022,952 | 6/1991 | Vaniglia .............................. 156/441 |
| 5,114,087 | 5/1992 | Fisher et al. ....................... 242/45 X |
| 5,117,241 | 5/1992 | Stephenson ..................... 400/225 X |

OTHER PUBLICATIONS

"Tension Control for Filament Winding", Electroid Co. Catalog #888TF.
"Servo-Fadenspannungsregler STC/Servo Fibre Tension Controller STC", Josef Baer.
"TCM-1950", Electroid Co. Catalog #TF1950.
"Tension Control by Electronic Gearing", Article from Servo-Trends May 1991 (Galil Motion Controllers).
"Drive Controllers Move Carbon Fibers With a Light Touch", Power Transmission Design, pp. 62-63 (May, 1991).
"Controlling Tension in Filament Winding", Advanced Composites, pp. 62 and 64 (Mar./Apr., 1988).
"Controlling Precision Winders With Clutches and Brakes", Power Transmission Design, pp. 25-27 (Oct., 1988).
"TC-1 Tension Controller", Electroid Co. Catalog #TC1389.
"New 2000 Series Tension Control", Electroid Co. Catalog #TCM2000.
"New Electronic Tensioner for Coil Winding", Electroid Co. Catalog #CWT100.
"New From Electroid MCM-100", Electroid Co. Catalog #MCM100.
"Controlled Slip Brakes Automate Multiple Tensioner", reprint from Design News (2/26/90).
"Proper Tension Control: Crucial to Quality Composites", IPN (Mar./Apr., 1990).
"Tomorrow's Tension Control . . . Available Today", Electroid Co. (single Sheet).
"Electroid, The Leader in Precise Tension Control Offers Yet Another New Product", Electroid Co. (Single Sheet).

*Primary Examiner*—David A. Simmons
*Assistant Examiner*—Mark A. Osele
*Attorney, Agent, or Firm*—Wood, Herron & Evans

[57] ABSTRACT

To maintain tension on a fiber tow as it travels between a spool of the tow and a fiber placement head in a computer controlled fiber placement machine, closed tension loop servo control tow velocity feed forward is provided to control spool rotation so as to not only provide closed loop tension control but to also cause rotation in anticipation of expected tow movement such as due to tow payout upon commanded movements of the fiber placement head. Gain scheduling based on spool radius is also provided. Additionally, a compliant roller is provided to reduce tension dips and spikes from disturbances on the tow, and an inner velocity loop is included with the closed tension loop to provide more effective control of tow tension. The servo control is reconfigurable into an open or pseudo-closed loop mode with a safety low power supply to slowly reel-up slack tow after tow threading, for example, and to otherwise maintain low tension on the tow to hold it in the machine while allowing servicing thereof. A broken tow test is also provided to detect tow slippage indicative of tow breakage or a possible part defect.

20 Claims, 19 Drawing Sheets

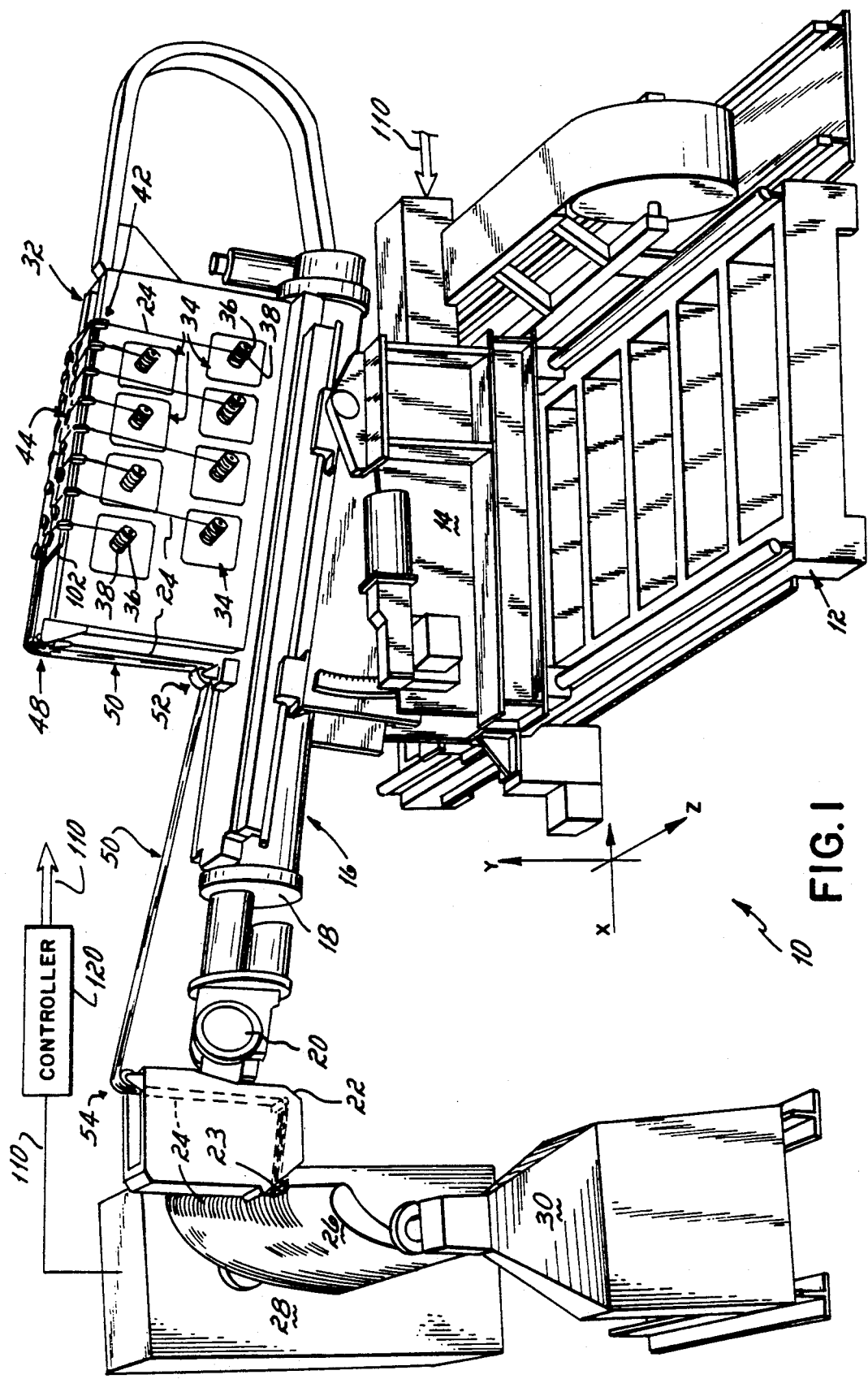

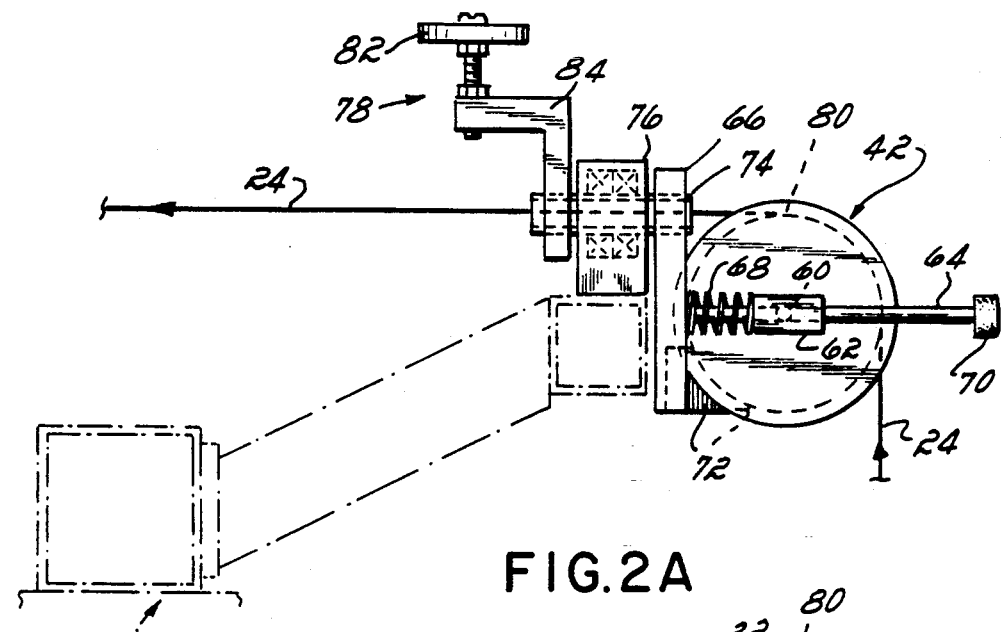
FIG. 2A
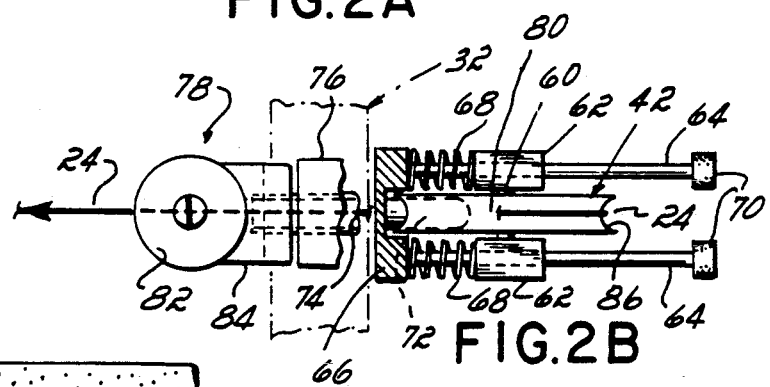
FIG. 2B
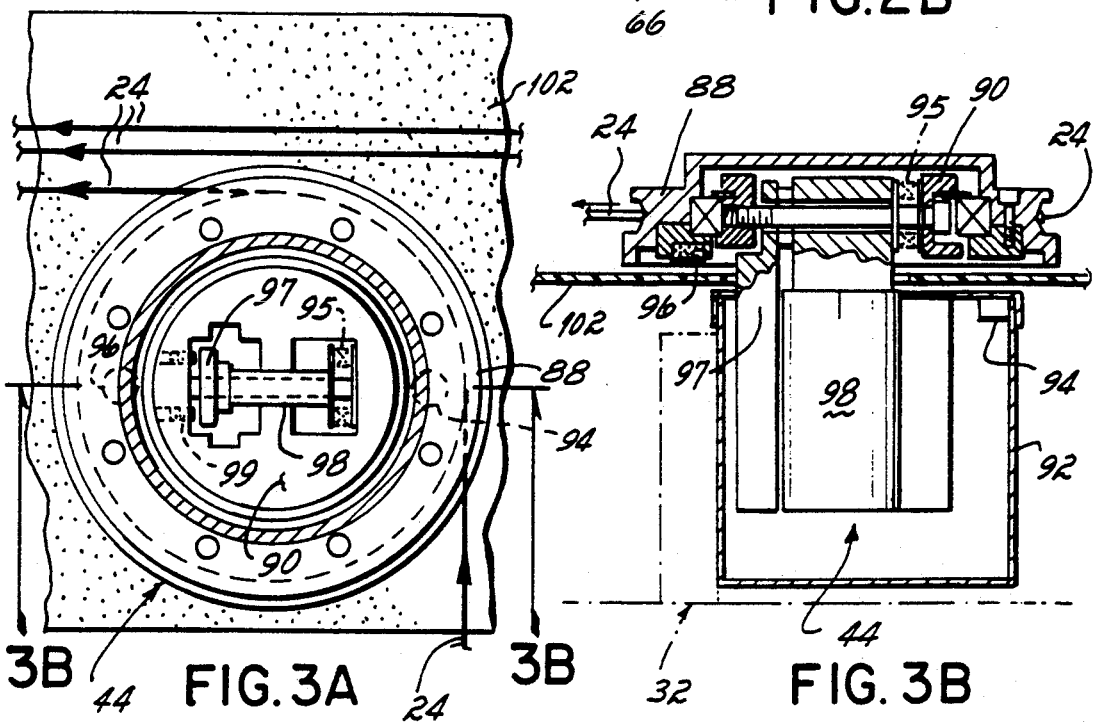
FIG. 3A
FIG. 3B

INTELLIGENT SERVO-CONTROLLED FIBER PLACEMENT MACHINE TENSIONER

BACKGROUND OF THE INVENTION

I. Field of the Invention

The present invention relates to computer controlled fiber placement machines which apply bands of fiber tows to a mandrel or the like to construct components made up of the fiber tow material. More particularly, the present invention relates to controlling the tension on the fiber tows in the active application mode of operation of such machines as well as to control tow take-back to avoid snap-back after rethreading a tow.

II. Description of Prior Art

By way of background, a computer controlled fiber placement machine includes a creel assembly which feeds a band of individual fiber tows under tension to a tool such as a fiber placement head. Each fiber tow is typically provided from a respective spool mounted for rotation on a motor driven chuck on the creel assembly. Each tow is individually threaded from the chuck-mounted spool and through a guidance structure such as over various rollers and on to the fiber placement head. After each tow is threaded, any slack in the tow must be taken up to place the tow under tension for proper application by the fiber placement head.

The fiber placement head is mounted to a robot wrist, for example, and is thus movable under program control through a wide variety of spatial orientations. As the fiber placement head moves about, one or more of the fiber tows are to be applied to either a stationary or rotatable mandrel, for example, to construct a component such as an air foil. Where the mandrel is rotatable, it too may be under program control. During application of the fiber tows to the mandrel, it is desired to maintain the tows under tension between say 1 to 10 lbs. However, the desired or necessary tension may vary as a function of speed of application such as caused by rotation of the mandrel and/or movement of the tow by the fiber placement head, for example. To this end, it has been proposed to provide a computer driven servo-control tensioner by which to control tension under program control as the tows are being applied, i.e., in the active application mode of the machine.

More specifically, it has been proposed to provide a closed-loop microprocessor based servo-controlled tensioner which accepts programmed tension setpoints from a computer numerical control (CNC) controlling the overall machine, and to vary the signals to the motor driven chuck in an effort to achieve and maintain the commanded tension setpoint. As will be appreciated, users of computer controlled fiber placement machines typically program the CNC in so-called world coordinates which define selected points of tow application relative the frame of the machine, such as at the centerpoint of the robot wrist supporting the fiber placement head. The user may also pre-program tension setpoints at these selected points or world coordinates. The CNC manipulates the world coordinate inputs to divide them into a plurality of incremental tool paths between each pair of world coordinates input by the user so as to define a plurality of incremental moves of the various parts of the machine by which to cause the fiber tows to be applied between the world coordinate pairs. At each new world coordinate, the CNC provides the programmed tension setpoint (if different from the prior tension setpoint) to the tensioner microprocessor to define the tension which is to be maintained for each incremental move of the machine parts to the next world coordinate. To this end, the tension setpoints from the CNC may be utilized by the tensioner microprocessor in a feedback loop which compares actual tension on the tow and the commanded tension setpoint to generate a tension error signal. Typically, the feedback loop also includes a filter to compensate for known characteristics of the tensioner such that the tension error signal is modified in a predetermined manner such as by proportional, integral and/or derivative functions as is well known. The filtered tension error signal is coupled to the chuck motor and causes the motor to tend to rotate in a direction which would either reel-off or spool-up the tow so as to decrease or increase tow tension, respectively, in an effort to achieve and maintain the commanded tension.

Experience has shown, however, that undesirable fluctuations in actual tension may still be encountered with such a closed-loop servo-control system. For example, the tensioner system must be able to maintain a tension setpoint as low as ½ pound on the tow even while the tow experiences acceleration or other disturbances on the tow. Because low tension setpoints may thus be involved, the allowable tension error is necessarily extremely small such as less than ¼ pound. However, a variety of disturbances have been encountered in operating the tensioner system which can cause large dips and spikes in the tension making it difficult to maintain tension control. Such dips and spikes may occur not only from acceleration of the tow but also from mechanisms used in the machine which strike the tow or when the tow snaps-off of the spool such as tends to occur with tacky fiber tows or tow pregs as the tow pays off of the spool. On the other hand, the tensioner system must also be able to maintain much larger tensions on the tow, for example, upwards of 15 pounds. Yet, tension control is to be accomplished independent of the type of composite tow material and size or weight of the spool or the material. Accordingly, improvements to closed loop tension servo-controls are believed necessary.

Additionally, whenever a new spool is to be placed on the creel assembly, or a fiber tow breaks, it may be necessary to thread the tow from the chuck-mounted spool, through the rollers of the guidance structure, and into the fiber placement head. This threading process is normally accomplished with the tensioner disabled and by an operator manually pulling off lengths of tow from the spool and threading the loose tow through and around the appropriate rollers. As the operator pulls off lengths of tow, however, there may be a tendency for too much of the tow to reel-off. After the tow is threaded, control of the tensioner is to be restored to the CNC whereupon tow take-back may occur to tighten up the tow and place it under tension. As the CNC program is predefined without knowledge of the amount of reel-off, upon restoring control to the CNC, there may be a sudden and undesirable snapping action on the loose tow as the active servo-controlled drive seeks to restore the tension by respooling the tow. Accordingly, improvements to the tensioner are desired to reduce snap-back as the active application mode is restored and on tow take-back.

SUMMARY OF THE INVENTION

The present invention provides a method and apparatus for controlling tension on a tow which overcomes the drawbacks of prior art approaches to tension control. More particularly, the present invention provides a configurable servo-controlled tensioner which provides desirable tension control not only in the active application mode but for tow take-back and restoration of the active application mode after a tow is threaded.

To this end, and in accordance with the principles of the present invention, in the active application mode, the servo control is configured as an active closed-loop servo wherein the tension error signal developed by the servo control also includes a component corresponding to the expected rotational velocity of the spool of fiber tow corresponding to the expected payout rate of the tow from the spool. Consequently, the tensioner system anticipates pay-out or reel-up of the tow due not only to changes in tension but also due to changes in the length of the tow resulting from machine motion so as to better follow or track such motion. More specifically, the tension error signal utilized to control spool rotation is based not only on the difference between the tension setpoint and the actual tension, but also on the difference between actual shaft RPM of the motor driven chuck and the expected shaft RPM thereof which would correspond to the rate of fiber tow payout as the fiber placement head moves and/or the mandrel rotates. Preferably, the expected shaft RPM is based upon the incremental tool paths and related commands from the CNC. Inclusion of the expected tow payout velocity component is believed to greatly reduce or eliminate tension fluctuations, especially those due, for example, to frictional and inertial effects which we believe to be the major contributors to tension fluctuation.

In a preferred embodiment, one of the rollers of the tow guidance structure over which the fiber tow is guided is spring-mounted so as to provide additional compliance on the tow thereby minimizing the effects on the tension of tow acceleration/deceleration and/or other disturbances on the tow. To stabilize the effect of motion on the tow and to increase responsiveness of the tensioner system to tension commands, an inner velocity closed loop is included with the tension loop. By virtue of the foregoing, better tension control with fewer unacceptable fluctuations in tow tension is achieved.

When the tows are to be applied to the mandrel, i.e., in the normal active application mode, the motor driving the spool chuck is powered from a high voltage power supply source. In accordance with an added feature of the present invention, a safety feature is introduced when the tensioner is not to be in the active application mode (such as where a tow is to be threaded) by reconfiguring the servo control power supply interconnection. To this end, the motor drive is disconnected from the high voltage power supply and is instead connected through a limiting circuit to a low voltage power supply to inherently severely limit the driving speed and torque of the motor. In this way, tension or torque commands may be utilized by the tensioner without risk of runaway or high torque performance. Thus, for example, to thread a tow, the servo control is disabled (i.e., driven with a "zero" torque signal) and the motor is connected to the power safety circuit as described whereupon lengths of fiber tow may be reeled off for threading.

After the tow is threaded, there will usually be some amount of slack to be taken up. To avoid the snapping-back action typically encountered during such tow take-up, the servo-control is reconfigured into a slack take-back mode with the low voltage power supply still engaged and the servo driven by an internally generated low level torque command. As a result of the low voltage supply, the spool rewinds the tow very slowly and without deleterious snap-back. After the tow is rewound, the tensioner maintains a low tension on the rewound tow until the machine is placed back into the active application mode. As a safety precaution, if the spool is able to rewind beyond a preset limit, such as could occur if the tow were to break or be improperly threaded, an alert is given to the CNC and the internal torque command terminated.

In a preferred embodiment, the creel assembly supports a plurality of tensioner modules each of which supports and independently controls a single spool of tow material. With such independent control, multiple tows may be threaded one at a time. More specifically, after a tow is threaded, the tensioner may cause the spool to rewind and place the tow under tension without further commands from the CNC. The tensioned tow is thus held in place in the guidance structure and out of the way of other tows as they are being threaded. Further, any one tensioner module may go out of the active application mode without necessarily interfering with operation of the other tensioner modules. However, before servicing the machine, such as to thread a tow, all tensioner modules, as a safety precaution, will be directed by the CNC to go out of the active application mode to the low power slack take-up mode to simply keep the tows under light tension and in place in the guidance structure.

When the CNC indicates to a module that the active application mode is to be restored, such as after all tows are threaded, the module internally generates a larger torque command signal to the motor drive and monitors the tension feedback sensor associated with that module for a signal indicating that the threaded tow is under tension. Thereafter, the servo control is reconfigured for the active application mode, i.e., the motor drive of the module is reconnected to the high voltage power supply and the servo control again responds as above-described to CNC tension setpoint commands. As a safety precaution, the microprocessor in each tensioner module automatically terminates operation of at least that module if the tension feedback signal is not received within a short time after the larger torque command signal is applied and a signal transmitted to the CNC to possibly halt operation of the entire machine.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

FIG. 1 is a perspective view of an exemplary fiber placement machine having several tensioner modules to which the present invention is applicable;

FIGS. 2A and 2B are top and side diagrammatic views, respectively, of a portion of the machine of FIG. 1 showing a spring-mounted or compliant roller;

FIG. 3A is top diagrammatic view of another portion of the machine of FIG. 1 showing a tow tension and motion sensor;

FIG. 3B is a view along line 3B—3B of FIG. 3A;

FIGS. 8-18A and 18B are flow charts of the operation of the servo control of the tensioner module of FIG. 5 for controlling tension in accordance with the principles of the present invention. FIGS. 18A and 18B are collectively referred to hereinafter as FIG. 18.

DETAILED DESCRIPTION OF THE DRAWINGS

Figure 4:
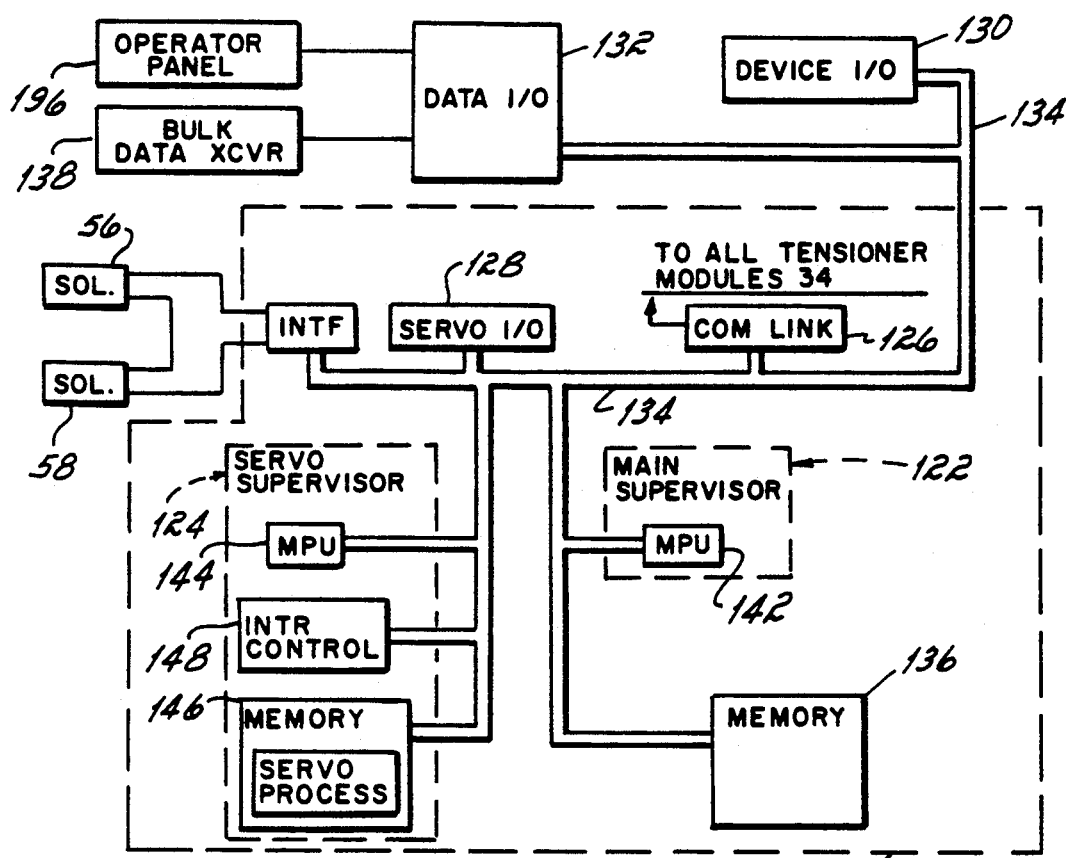
FIG. 4 is a schematic diagram of the CNC controller of FIG. 1 for providing program control of the fiber placement machine of FIG. 1.

With reference to FIG. 1, there is shown an example of a program controlled fiber placement machine 10 to which the present invention is applicable. Machine 10 of FIG. 1 is a tilt-cross feed machine as shown and described in U.S. application Ser. No. 07/445,583, entitled "Fiber Placement Machine", filed Dec. 4, 1989, and assigned to Cincinnati Milacron Inc., the assignee of the present invention. The disclosure of said application Ser. No. 07/445,583 is incorporated herein by reference. CNC controller 120, which communicates with various portions of machine 10 over communication lines 110, may be an Acramatic 975-F CNC also available from Cincinnati Milacron.

Fiber placement machine 10 includes a base support 12 on which is slidably supported carriage 14. Horizontal motion of carriage 14 relative to base support 12 defines the Z-axis of motion of machine 10. Movably supported on carriage 14 for movement in the X- and Y-axes of machine 10 is cross-slide 16. Supported at the forward end or forearm 18 of cross slide 16 is a multi-axis robot wrist 20 to which is attached fiber placement head or tool 22 for placing a plurality of fiber tows 24 on mandrel 26 rotatably or fixedly supported by a mandrel unit such as a headstock 28 and a tailstock 30. Fiber placement head 22 may include a cut, clamp and restart unit (not shown) and a presser member 23 whereat fiber tows 24 are impressed onto mandrel 26 to form a component such as an air foil. Payout of tow 24, resulting from relative motion between mandrel 26 and head 22 is defined as the U-axis of motion of machine 10. An example of a suitable fiber placement head 22 is shown and described in U.S. application Ser. No. 07/445,201, entitled "Fiber Placement Head", filed Dec. 4, 1989, and assigned to the assignee hereof.

The disclosure of said application Ser. No. 07/445,201 is incorporated herein by reference.

Included in forearm 18 is a drive mechanism (not shown) for actuating wrist 20, as is well understood. Forearm 18 and wrist 20 could be of the serial roll type shown in U.S. Pat. No. 4,068,536, assigned to the assignee hereof, and the disclosure of which is incorporated herein by reference. Wrist 20 is preferably of the roll-bend-roll type such that movement of multi-axis wrist 20 defines the yaw or roll1 (I), pitch or bend (J), and roll or roll2 (K) axes of motion of machine 10.

Mounted to cross slide 16 for movement therewith is creel housing 32 supporting a plurality of creel or tensioner modules 34 each of which independently supplies a tow 24 of reinforcing fiber material such as carbon fibers impregnated with a matrix material such as epoxy resin (tow preg). Tow 24 may alternatively be made of glass, aramid, boron or metal fibers, for example. Each module 34 includes a motor driven chuck 36 extending therefrom to support a spool 38 of tow material thereon to be payed out to head 22. Chuck 36 may be opened or closed (unchucked or chucked) to allow a spool to be removed therefrom or placed thereon as is well understood. Chuck 36 is rotatably driven by a motor 40 (FIG. 5) under control of the tensioner module 34 (FIG. 5) and controller 120 (FIG. 4) to maintain tension on tow 24 as will be described.

Mounted atop housing 32 are a plurality of compliant redirect rollers 42 (FIGS. 2A and 2B) and tow tension and motion sensors 44 (FIGS. 3A and 3B), one of each per module 34. Each tow is individually threaded over a compliant roller 42, a sensor 44 and then over grooved roller 48 associated with creel housing 32 to collimate tows 24 into a band 50. Band 50 of tows 24 is then trained around a pair of swivellable redirect roller assemblies 52, 54 to be guided between creel housing 32 and fiber placement head 22. Further details of the structure, operation and control of redirect roller assemblies 52, 54 are given in U.S. Pat. No. 4,872,619 and U.S. application Ser. No. 07/553,518, entitled Redirect Roller Control for Fiber Placement Machine, filed Jul. 16, 1990, both of which are assigned to the assignee hereof. The disclosures of said U.S. Pat. No. 4,872,619 and said application Ser. No. 07/553,518 are each incorporated herein by reference. Additionally, it will be appreciated that as head 22 moves about, the spatial relationship of redirect roller assemblies 52, 54 will change thus, effectively, changing the length of tow 24 between head 22 and spool 38 possibly necessitating pay-out or reel-up of tow 24 to maintain the desired tension on the tow. This change in length will be referred to hereinafter as the roller-to-roller distance change or RRC and is computed in CNC controller 120 and utilized to provide a tow velocity feed forward signal ($TV_{FF}$) to the tensioner modules 34 for use in controlling tension on the tows 24 to anticipate the effects of RRC as will be described.

Within head 22, each tow passes through a restart roller assembly and cut/clamp assembly both as described in aforesaid application Ser. No. 07/445,201. As each tow is to first be payed out of head 22, restart roller solenoid 56 (FIG. 4) is fired to close the pinch roller against the driven roller of the restart roller assembly to begin movement of tow 24 in what is defined as the Q-axis of motion of machine 10. After application of a length of tow 24 to mandrel 26 (or prior thereto such as to cut off a loose piece of tow 24), cut/clamp solenoid 58 (FIG. 4) is fired to cut the tow 24 and clamp the exposed end in place in head 22 until it is to next be applied to mandrel 26.

As machine 10 operates, and tow 24 pays out, disturbances to the tow such as the accelerated motion of the tow due to machine motion or the tendency of the tow to snap as it is peeled off the spool causes dips and spikes in tension. To help reduce such tension fluctuations, compliant rollers 42 are provided. As shown more clearly in FIGS. 2A and 2B, each compliant roller 42 rotates with axle 60 rotatably mounted at its ends to slide blocks 62 which ride on shafts 64 mounted to support block 66. Each slide block 62 is urged away from support block 66 by spring 68 sandwiched between blocks 62, 66 and coaxial with shaft 64. Preferably, the mass of the combined roller 42, axle 60 and support block 66 is sufficiently low that the natural frequency for the spring constant of springs 68 is higher than the inner velocity loop closed loop bandwidth in the active application mode. In a preferred embodiment, two springs 68 provide a net spring constant of about 8 lbs/in and the inner velocity loop closed loop bandwith is 20 Hz. As tow 24 passes over roller 42, the roller is urged towards block 66 by the tension on tow 24. As the tension is relieved, roller 42 moves away from block 66. As a result of the foregoing, additional compliance is provided on the tow and the adverse affects of tension spikes and dips are reduced. The outward end of shafts 64 is provided with a bumper cushion or the like 70 to absorb shock should the tow break, for example, such that springs 68 suddenly push roller 42 outwardly to the end of its travel. Similarly, block 66 is provided with a stop 72 to prevent roller 42 from impacting block 66 when tow tension pulls roller 42 too tightly.

To facilitate tow pay out from spool 38, roller 42 is also gimballed to aim at spool 38 along the path of tow 24 as the diameter of spool 38 changes due to tow pay-out or take-back. Block 66 is connected via tubular pivot shaft 74 through mounting bracket 76 to counterweight assembly 78. Tow 24 passes through shaft 74 along the axis of shaft 74 and tangent floor 80 of the radiused root along the top side of roller 42 so that gimballing occurs along that tangent line. As will be appreciated, counterweight assembly 78 is adjustable by moving weight 82 up or down relative its support 84 to cause roller 42 to generally maintain the gimballed attitude as urged upon it by tension from tow 24. Mounting bracket 76 is connected to creel housing 32 whereby as tow 24 pays off from spool 38, roller 42 is gimballed accordingly to take into account changes in diameter of spool 38. Preferably, roller 42 is made of low friction material such as polytetrafluoroethylene and has a radiused root as seen in FIGS. 2A and 2B to reduce the likelihood of roping (i.e., tow curl-up against the edges 86 of roller 42) as roller 42 gimbals and to facilitate such gimballing action.

Referring to FIGS. 3A and 3B, sensor 44 includes a rotating roller 88 over which tow 24 passes between compliant roller 42 and grooved roller 48. Roller 88 is rotatable about a floatable axle carrier 90 over block housing 92. Housing 92 is fixedly bracketed to creel housing 32 and contains therein hall effect sensor 94 for indicating each revolution of roller 88 every time magnet 96 affixed to roller 88 passes over sensor 94. Tension on tow 24 causes it to bear on roller 88. The stress on roller 88 is communicated to axle carrier 90 and in turn via four pairs of preloaded disc springs 95 (only three pair shown) to load cell or strain gauge sensor 98 supported by housing 92. Sensor 98 thus generates signals corresponding to the tension on tow 24. Extending from housing 92 is a stop mounting block 97 against which axle carrier 90 may bear in the event of extreme tension on tow 24 which would otherwise overload or damage sensor 98. Similarly, set screws 99 are provided on axle carrier 90 opposite springs 95 to protect sensor 98 in the event of rebound of carrier 90 such as could occur if tow 24 breaks. Signals from hall effect sensor 94 and strain gauge sensor 98 are preferably amplified and conditioned and then coupled over wires 100 (see also FIG. 5) to the associated tensioner module 34 for use in monitoring and controlling tension on tow 24 in conjunction with signals from controller 120. Mounted atop creel housing 32 is a plastic plate 102 to support tows 24 from other modules above creel housing 32 should tension go slack.

In order to control operation of machine 10, controller 120 generates commands over wires 110 to control movement of all of the machine parts in their various axes. Controller 120 additionally communicates over wires 110 with the tensioner modules 34 by which to control the status of machine 10 and to control tension on tows 24 as will be described. As is well understood, and as discussed in aforementioned application Ser. No. 07/553,518, controller 120 is utilized to monitor and control motion and the functions of machine 10 and is implemented as a digital microprocessor-based computer system. Hence, the various command signals generated within controller 120 are implemented as digital words.

Referring to FIG. 4, controller 120 includes a plurality of independent modules including main supervisor (or block processor) 122, servo supervisor 124, communication link (com link) 126 by which to communicate with modules 34 as will be described, a plurality of servo input/output modules (servo I/0) represented as at 128, device input/output module 130, and data input/output module 132, all connected by a common bus 134. Each of those modules typically includes a microprocessor and associated peripheral devices and memory as required for the function of the module such as the 80186 microprocessor and peripheral devices available from Intel Corporation.

Controller 120 also includes a main memory 136 in which is stored the application program(s) in blocks containing world coordinates (Q, U, X, Y, Z, I, J and K, for example) relating the tool centerpoint at presser member 23 to the machine frame and, preferably, solenoid commands for solenoids 56 and 58 and tension commands for modules 34 on creel housing 32, all of which collectively define the overall cycle of operation of machine 10 by which to construct the component on mandrel 26. The application program stored within memory 136 may be produced on independent equipment and loaded through the data input/output module 132 from a bulk data transceiver 138.

The application program stored in memory 136 is executed by microprocessor unit 142 of main supervisor 122 until the end of the program has been reached, i.e., all the moves of placement head 22 have been completed and the component constructed. To this end, main supervisor 122 generates span and control signals (see FIG. 6A) for each axis of movement of machine 10, which signals are utilized by servo supervisor 124 to repetitively generate incremental change in position command signals by which to control operation of the servo control modules as will be explained. Servo I/0 128 may actually be several such modules, all of which collectively communicate with the various drives, actuators, sensors or resolvers, and other aspects of machine 10 which cooperate in response to command signals from servo supervisor 124 to cause head 22 to apply fiber tows 24 to mandrel 26 to construct components.

Servo supervisor 124 includes a local microprocessor 144 executing servo processing programs (see FIGS. 6B-6D) stored within local memory 146 and an interrupt control 148 responsive to interrupts from a master servo I/O (for example, one of the servo I/O's represented by servo I/O 128 may be selected as the master servo I/O). In response to an interrupt from the master servo I/O, such as every 10 milliseconds, change in position or velocity command signals are determined by servo supervisor 124 for each of the axes (including U- and Q-axis) and swivel command signals for controlling redirect roller assemblies 52, 54 are determined (during which RRC and $TV_{FF}$ are computed) and the various command signals distributed to the servo I/O's 128. Servo supervisor 124 also generates the commands from the world coordinate program in memory 136 to be used in controlling the state of restart roller solenoid 56 and cut/clamp solenoid 58 for each tow by which to selectively payout from and/or clamp in head 22 each tow 24 as described in aforesaid application Ser. No. 07/445,201. Feed forward signals including the status of solenoids 56 and 58, the velocity command signals computed for the U- and Q-axes, and $TV_{FF}$ are coupled, as are tension set point commands (TSC), to the respective tensioner modules 34 via com link 126 to cause the appropriate tension control of tows 24 in the active application mode as will subsequently be described. Main supervisor 122 also communicates with tensioner modules 34 via com link 126 to know the status of each module 34 and/or to control same.

Figure 5:
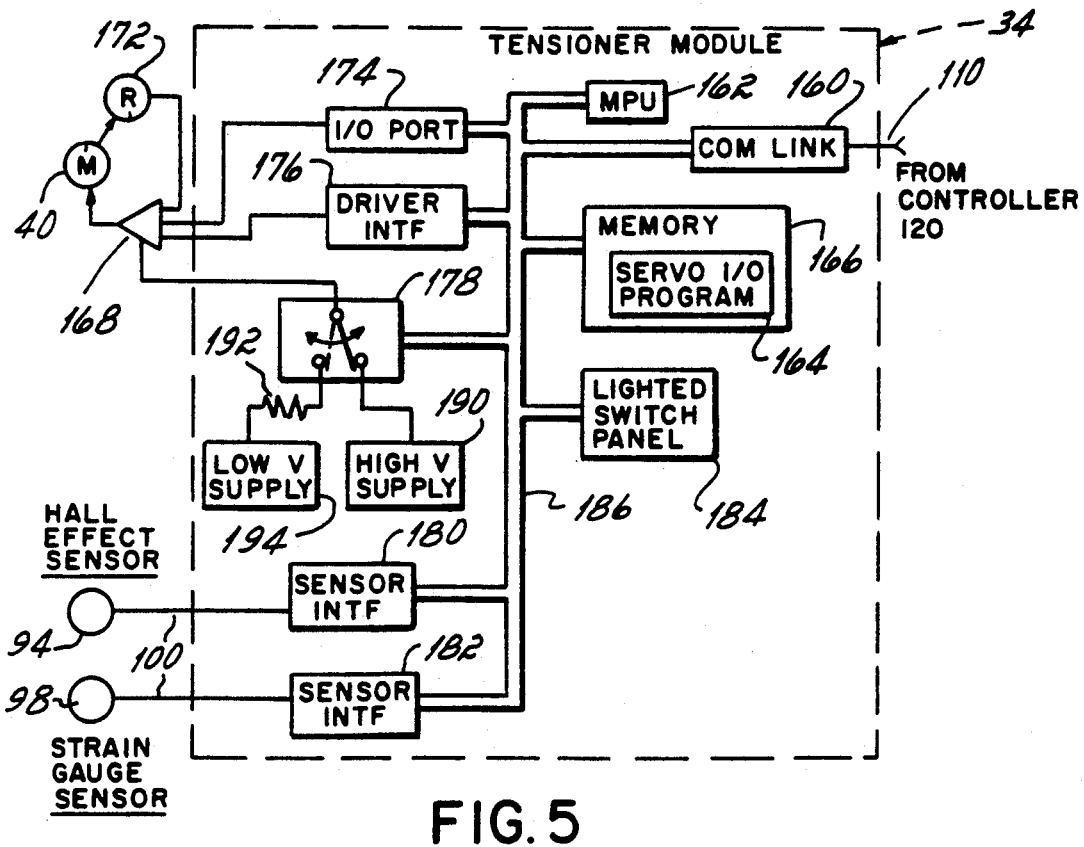
FIG. 5 is a schematic diagram of a tensioner module of the machine of FIG. 1.

Referring now to FIG. 5, there is shown schematically one of modules 34 which communicates over wires 110 to com link 126 of controller 120. Only one module 34 is shown in detail, it being understood that the other modules 34 of machine 10 are substantially the same. Typically, there are as many as thirty-two such modules in multiples of two. Each module 34 is independent of the others and controls a single tow 24. Each module 34 includes its own com link 160 by which to exchange signals in serial fashion between controller 120 and the module. Com links 160 and 126 (FIG. 4) include dual port memory devices to allow for asynchronous transfer of signals between modules 34 and controller 120.

Local processor 162 of module 34 executes tensioner programs 164 (see FIGS. 8-18) stored within local memory 166 to configure the module for the appropriate mode of operation and to control operation in that mode as well as to control communications with controller 120 so that motor 40 may be driven as appropriate to obtain and/or maintain tension on tow 24. To this end, motor 40 is caused to rotate in response to signals from module 34 by drive amplifier 168. Preferably, motor 40 is a brushless DC electronically commutated motor (ECM) and thus includes a resolver 172, for example, coupled to the motor shaft. Signals from resolver 172 are used by drive amplifier 168 to effect commutation as is well understood. Drive amplifier 168 preferably includes a gain adjustment (not shown) to manually set the gain thereof so that a predetermined torque or tension signal from local processor 162 will produce a predetermined torque at motor 40. Drive amplifier 168 further preferably includes a balance adjust (not shown) by which to manually set the bias therein so that a torque or tension signal of zero volts will result in an angular velocity of zero of motor 40. Digital signals from drive amplifier 168 based upon the signals from resolver 172 are also utilized to provide shaft position feedback through I/0 port 174 to module 34 indicative of the angular position of chuck 36 and spool 38 for purposes of computing spool radius and an electronic velocity loop for tension control as will be described.

Local processor 162 communicates with com link 160, and memory 166, I/O port 174, driver interface 176, relay 178, sensor interfaces 180, 182, and lighted switch panel 184 over local bus 186 by which to control operation of module 34 in its various modes. In the active application mode of machine 10, processor 162 sends a signal to relay 178 to place it into a high drive state wherein drive amplifier 168 for motor 40 is connected to a high voltage power supply source 190 such as a 300 volt supply. In other modes, relay 178 is caused to be placed into a low drive state wherein drive amplifier 168 is connected through limiting circuit 192 such as a 15 ohm resistor to low voltage power supply 194 such as a 12 or a 24 volt supply for safety purposes and to inherently severely limit driving speed and torque of motor 40 such that with a 3.11:1 gearing ratio between motor 40 and chuck 36, the maximum speed of tow payout is about 15 in/sec (about 100 RPM for the chuck) and the torque on tow 24 is limited to about 10 ft-lbs.

To thread a tow, module 34 is placed into the threading mode wherein relay 178 is placed in the low drive state and drive amplifier 168 provided with a "zero" drive signal (i.e., local processor 162 generates an internal torque command, or TC, equal to zero). In the threading mode, tow 24 may simply be reeled off spool 38 without significant resistance from motor 40. After tow 24 is threaded over compliant roller 42, sensor 44 and the remaining guidance structure to head 22, module 34 is ready to take up any slack on the tow. To this end, a signal may be transmitted to local processor 162 to go into the slack take-up mode. That signal may come from CNC controller 120 by activating a button (not shown) on operator panel 196 coupled to controller 120 or may come from activating a lighted switch on panel 184. When module 34 is in the slack take-up mode, the lighted switch is preferably caused to blink on and off.

In the slack take-up mode, local processor 162 generates a take-up torque signal (TC) to driver interface 176 which is converted into an analog voltage or current signal to cause motor 40 to rotate slowly in reverse. While slack is being taken-up, signals from sensors 94 and 98 are ignored so that, as to tension or torque control, the servo control is open loop in nature. Signals from resolver 172 are monitored via I/O port 174 to be sure motor 40 has not rotated more than would be necessary to fully take back the entire tow 24, e.g., 90 turns, as that would indicate a break or malfunction somewhere. Should that occur, local processor 162 will cease generating torque signals to driver interface 176 and would also send an alert to controller 120 via com link 160. As a result of the low voltage from supply 194, motor 40 can only slowly reel up the excess tow and thus will not cause snap-back of the tensioner. The slack take-up mode is also used to hold tension on tow 24 to hold it from falling out of its grooves in roller 48 and redirect roller assemblies 52, 54 while other tows are being threaded or in the event machine 10 is to be serviced while in operation. To this end, in the slack take-up mode, signals from resolver 172 may also be utilized in a pseudo closed loop to modify the internally generated torque take-up signal to account for viscous friction effects In the event machine 10 is to stop while in operation for such servicing, e.g., to thread a tow, a signal from controller 120 will be received by module(s) 34 causing the module to assume the slack-take-up mode, also referred to as a safety mode, in that limit resistor 192 prevents currents in excess of about 1 ampere from being applied by drive amplifier 168 as an added safety feature. Note also that module 34 is configured such that motor 40 is driven in an open loop or pseudo-closed loop manner in the slack take-up mode as no tension feedback is used to close the loop as would be the case for conventional tension control.

Once all modules 34 are in the safe mode, and each has sent a signal to controller 120 to advise of same after a period of time passing without the respective spools 38 rotating too many revolutions, the active application mode of machine 10 may be initiated. To this end, controller 120 transmits a signal to modules 34 to enter the active application mode which causes the modules to go into a transition mode in which local processor 162 generates a larger torque command signal to driver interface 176 so as to tighten up the tow, and tow tension sensor 98 is now monitored for presence of a few pounds of tension to indicate that the tow is threaded and sensor 98 is operable. Tension of at least about 1 lb. is required to be present for about ¼ second and module 34 will continue to test for that condition for about 5 seconds, failing which module 34 will revert to the slack take-up or safe mode with a lower torque command signal and will also send an alert to controller 120. If tension is detected as required, module 34 will reconfigure for the active application mode as will now be described.

In the active application mode, the blinking light switch on panel 184 is now turned full on (i.e., not blinking) and relay 178 is placed in the high drive state such that motor 40 may be driven fully. Further, local processor 162 begins to generate tension command (TC) signals to driver interface 176 based upon closed loop error control between commanded tension setpoints (TSC) from controller 120 and actual tension signals ($T_A$) from tension sensor 94. Further, and in accordance with the principles of the present invention, the tension command closed loop includes as an input an angular feed forward component $V_{ROT}$ based upon the feed forward components, i.e., the U- and Q-axes feed forward components, $TV_{FF}$ and the head solenoid states by which to adjust tension on tow 24 in anticipation of the expected movement of tow 24 in paying out from or being reeled up on spool 38. Still further, the tension command closed loop preferably includes an inner velocity error loop to improve servo performance. To better match control performance to actual spool 38 characterizations, the various signals utilized in generating command signals to motor 40 are modified, such as by way of gain scheduling, in relation to the diameter of spool 38 as it changes with tow payout and reel-up.

Figure 6A:
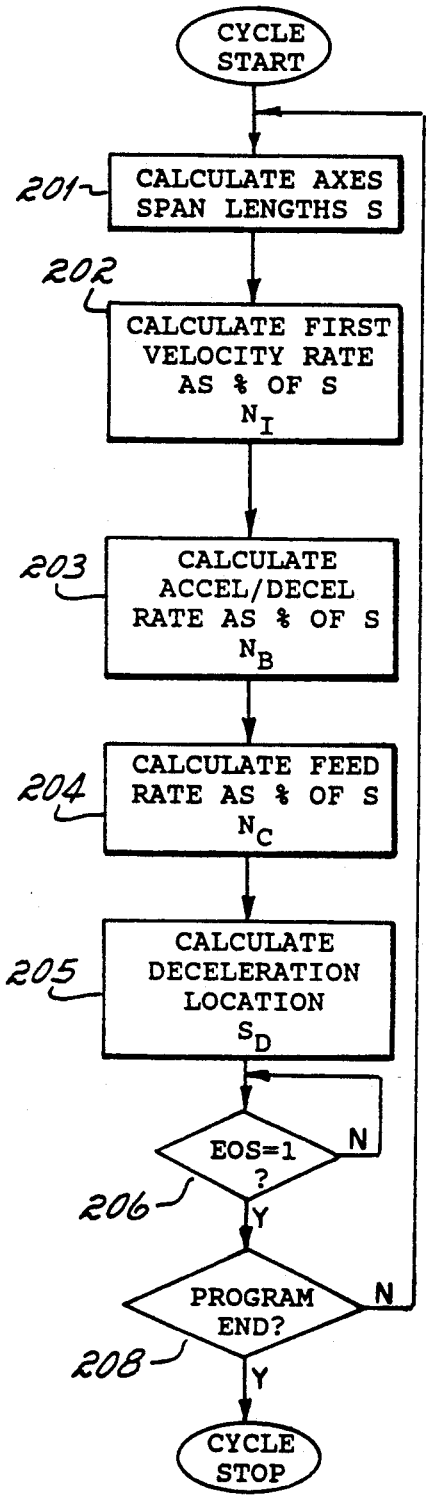
FIGS. 6A-6D are flow charts of the operation of the CNC controller of FIG. 4 for controlling movement in the various axes of the fiber placement machine of FIG. 1 and for generating feed forward commands to be utilized by the tensioner module of FIG. 5 in the active application mode.
Figure 6C:
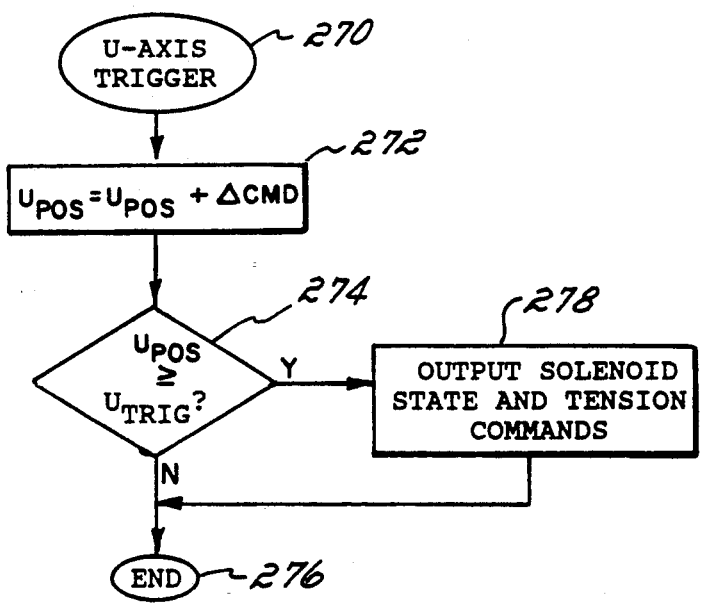
Figure 6B:
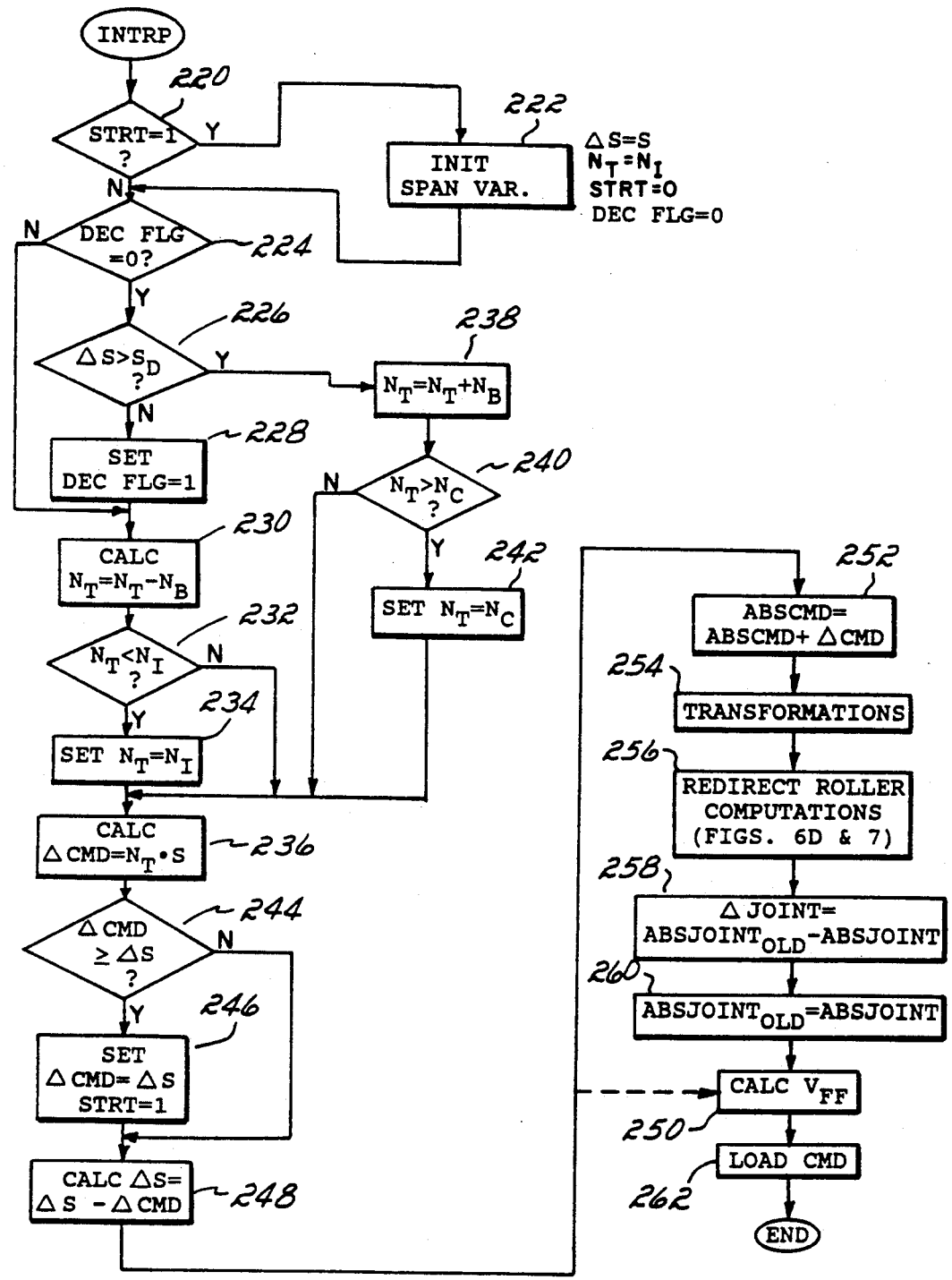
Figure 6D:
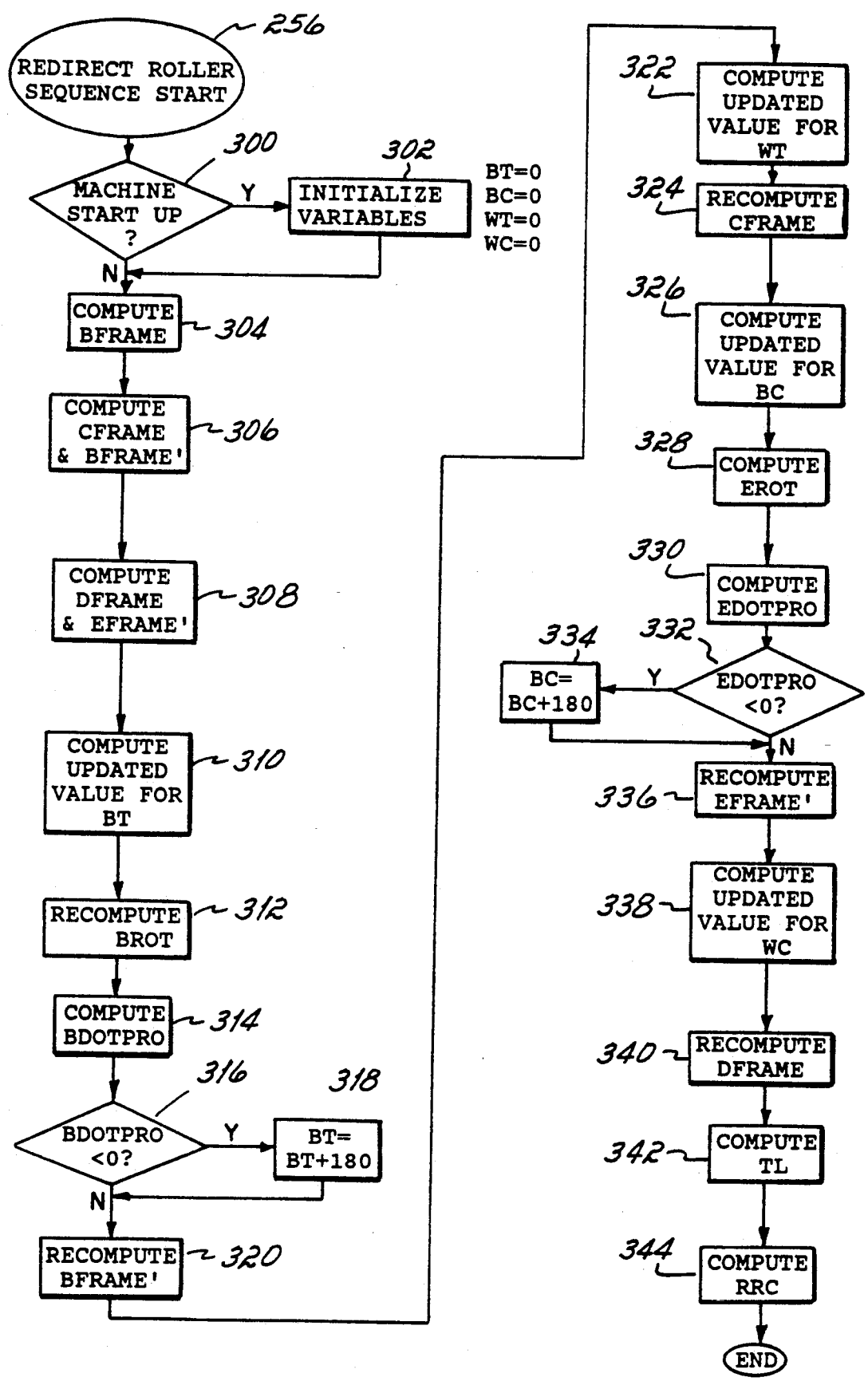

The above procedures for affecting tensioner module control during operation of the application program stored in memory 136 shall be described with reference to the flow charts. The flow chart of FIG. 6A illustrates the processing steps executed by main supervisor 122 to produce span and control signals in accordance with the application program defining locations and functions stored in memory 136. The flow chart of FIG. 6B illustrates the processing steps executed by servo supervisor 124 to generate change in position command signals for positioning head 22 and including the U-axis and Q-axis data from the span and control signals produced by main supervisor 122. The flow chart of FIG. 6C illustrates further processing steps executed by servo supervisor 124 to generate the solenoid commands and tension set point commands. The flow chart of FIG. 6D illustrates still further processing steps executed by servo supervisor 124 to compute various signals related to the spatial relationship of redirect roller assemblies 52, 54 for swivelling same and for computing $TV_{FF}$. Finally, the flow charts of FIGS. 8-18 illustrate the processing steps executed by microprocessor 162 of a module 34 in the various modes of operation of machine 10 to control tension in tow 24 in accordance with the principles of the present invention.

Processing of the procedural steps of the flow chart of FIG. 6A is initiated by a cycle start signal produced in response to the operation of a cycle start push button (not shown) on operator panel 196. At process step 201 data are computed which are required for the interpolation of intermediate points along a linear path, for example, between two successive programmed locations of the tool (tow application head 22) in world coordinates. The span length S in each axis (U, Q, X, Y, Z, I, J and K, for example) is determined from the world coordinate data of these locations. A pre-programmed velocity or feed rate is recalled from memory 136 and, in conjunction with the span length signal S for each axis, additional velocity control signals are calculated at process steps 202-205 as follows:

$N_I$ = the percent of S which the member is to move in the selected axis during the first and last interpolation intervals defining a step velocity change;

$N_B$ = the percent of S by which the interpolation incremental distance is to change;

$N_C$ = the percent of S which the member is to move during each interpolation interval in the constant velocity mode; and $S_D$ = the distance from the end of the span at which deceleration must begin from the programmed velocity.

These values for S, $N_I$, $N_B$, $N_C$ and $S_D$ are stored in a buffer in memory 136 for access by servo supervisor 124 during the servo supervisor's execution of the span.

After process steps 201-205 have been executed, the overall cycle of operation executed by the main supervisor is controlled by the completion of motion as indicated by the end of span signal detected at decision step 206. If the servo supervisor has not set the end of span flag, herein referred to as EOS, the sequence may idle at process step 206 until the end of the span is reached (EOS=1). Preferably, the sequence of steps 201 to 205 will be executed for the next span before the end of the previous span is reached in an effort to pre-process information to generate the next set of span and control signals which may then be loaded into a buffer.

Following completion of interpolation, a decision is made at process step 208 to determine whether or not the location defining the end of the current span corresponds to the end of the program stored in memory 136. If not, execution of the control procedure of FIG. 6A continues to process step 201 to initialize data for the next programmed span. Execution of the stored program of motion continues in this fashion until it is determined at decision step 208 that the last location of the program has been reached. Thereafter, the fiber or tow placement program execution ceases, but the entire program may be re-executed by operator intervention.

The axis command signal processing of servo supervisor 124 shall be described with reference to FIG. 6B. Periodically, in response to an interrupt signal generated by the master servo I/O, the span increment interpolation procedure of FIG. 6B is executed for each axis to output change in position and other servo command signals to the servo I/O modules 128.

At decision step 220 it is determined whether the current execution of the span increment interpolation procedure is the first execution for the current span. If it is, span variables are initialized at process step 222 in preparation for interpolation of the first increment of the current span. To this end, the span length remaining $\Delta S$ is initialized to the axis span length S; the current value of the increment factor $N_T$ is initialized to the step velocity factor $N_I$; the first execution flag STRT is initialized to 0; and the deceleration flag is initialized to 0. If the current execution of the span increment interpolation procedure is not the first for the span, process step 222 is skipped. At decision step 224, it is determined whether the deceleration flag has been set true, indicating that interpolation has progressed to the deceleration point $S_D$ or beyond. If so, the sequence proceeds to process step 230 as will be described, otherwise; execution continues at decision step 226 where it is determined whether the remaining span length $\Delta S$ is more than the deceleration distance $S_D$ calculated in the preinterpolation procedure at process step 205. If the remaining span length $\Delta S$ is not more than the deceleration distance $S_D$, execution continues at process step 228 where the deceleration flag is set true. Thereafter, a new value for the increment factor $N_T$ is calculated at process step 230 to decrease the magnitude of the increment factor $N_T$ by the acceleration/deceleration incremental adjustment $N_B$. At decision step 232 it is determined whether the new value of the increment factor $N_T$ is less than the step velocity factor $N_I$. If it is, the interpolation factor $N_T$ is set equal to the step velocity factor $N_I$ at process step 234. Otherwise, process step 234 is skipped. Thereafter, the sequence of FIG. 6B proceeds to process step 236 to calculate $\Delta$ CMD or $\Delta$ JOINT as will be described. As will become apparent, the new value of the increment factor $N_T$ will result in the interpolation of a smaller increment command ($\Delta$ CMD or $\Delta$ JOINT) with the next execution of the sequence of FIG. 6B thus effecting a decrease of the velocity of the affected machine member.

If interpolation had not progressed to the deceleration point, execution from decision step 226 would proceed to step 238 where the magnitude of the increment factor $N_T$ is increased by the acceleration/deceleration factor $N_B$. At decision step 240, the new value of the increment factor $N_T$ is compared to the constant velocity factor $N_C$ calculated during execution of the preinterpolation procedure at process step 204. If the increment factor $N_T$ is greater than the constant velocity factor $N_C$, it is set equal to the constant velocity factor $N_C$ at process step 242. Otherwise, process step 242 is skipped.

After either process step 234 or process step 242, the sequence of FIG. 6B proceeds to process step 236 whereat the magnitude of the change of commanded position ($\Delta$ CMD) is calculated as the product of the axis span length S and current value of the increment factor $N_T$. The magnitude of the change in commanded position $\Delta$ CMD is compared to the current magnitude of the remaining span length $\Delta S$ at decision step 244. If the change in commanded position $\Delta$ CMD is greater than or equal to the remaining span length $\Delta S$, the change in commanded position $\Delta$ CMD is set equal to the remaining span length $\Delta S$ at process step 246. Since this condition corresponds to interpolation of the last span increment of the current span, the start flag is set true and the end of span flag EOS is set true (=1). Process step 246 is skipped if the change in commanded position $\Delta$ CMD is less than the remaining span length $\Delta S$.

At process step 248, a new value for the remaining span length $\Delta S$ is calculated by subtracting the magnitude of the change in commanded position $\Delta$ CMD from the previous value of the remaining span length $\Delta S$. The sequence then proceeds either directly to process step 250 to calculate a velocity feed forward ($V_{FF}$) value based on $\Delta$ CMD for those axes not affecting tool centerpoint (application point of tow 24 to mandrel 26 by head 22) such as the U-and Q-axes (and the mandrel or C-axis), or to process step 252 to calculate a $\Delta$ JOINT command for those axes affecting the tool centerpoint by which to control movement of head 22 (i.e., X, Y, Z, I, J, and K) and from which command signals (SCMD) to control redirect roller assembly 52 and/or 54 are computed along with the value of RRC. The $\Delta$ JOINT, SCMD and RRC values are also modified at process step 250 to produce a velocity feed forward signal for the respective axes (referred to as $TV_{FF}$ for the tow velocity feed forward signal to tensioner modules 34). Because controller 120 is programmed to utilize moves in increments of one-thousandths of an inch every 10 ms, at process step 250, the value computed from the prior process step is inherently a velocity signal (distance of move every 10 ms) and is converted to inches/min by multiplying by 6. That value may also be divided by a software gain factor (GF) selected so that the voltage signal to the appropriate axis motor will result in movement correlated to a predetermined error signal, e.g., 1°/min or 1 in/min for one-thousandth degree or inch error signal so as to facilitate correction of known offsets and/or relationships in the associated gear/pulley mechanism, for example. In a preferred embodiment, GF is equal to 1.000 for each axis. The resultant value is $V_{FF}$ for that axis and may be used in conjunction with the command value ($\Delta$ CMD, $\Delta$ JOINT or SCMD) to control the movement of machine 10 in that axis as is well understood and as may be seen by reference to U.S. Pat. Nos. 4,719,397 and 4,799,981 assigned to the assignee hereof.

As mentioned, with respect to axes that affect head motion or tool centerpoint (X, Y, Z, I, J, and K), the sequence of FIG. 6B does not proceed directly from process step 248 to process step 250 but instead executes process step 252 whereat the absolute commanded position (ABSCMD) in the rotational axis of interest is calculated equal to the sum of the current ABSCMD and $\Delta$ CMD. At step 254, the ABSCMD commands calculated for each of the X, Y, Z, pitch, yaw and roll axes are transformed into absolute joint commands (ABSJOINT) in known fashion whereby each joint of machine 10 may be commanded so that head 22 will move to the absolute commanded position in the world coordinate axis system as discussed in U.S. Pat. No. 3,909,600 assigned to the assignee hereof, the disclosure of which is incorporated herein by reference. At step 256, as will be described in greater detail with reference to FIGS. 6D and 7, the ABSJOINT data for roll1, bend and ro112 (referred to as $I_j$, $J_j$, and $K_j$ as they are now joint commands relative wrist centerpoint W rather than world coordinate commands) from step 254 are utilized to compute the relationship between tow band 50 and redirect roller assemblies 52, 54. The data thus computed is used for purposes of computing RRC and to compute the commands for controlling swivel of redirect roller assembly 52 and/or 54, the latter as described in greater detail in aforesaid application Ser. No. 07/553,518.

The sequence continues to step 258 whereat the change in joint position Δ JOINT) command is calculated for each axis equal to the difference between the absolute joint command calculated on the previous pass of the sequence of FIG. 6B (ABSJOINT$_{OLD}$) and the present absolute joint command (ABSJOINT) for each axis. Then, at step 260, ABSJOINT$_{OLD}$ is set equal to the current ABSJOINT for use on the next pass through the sequence of FIG. 6B. At step 250, the velocity feed forward component (V$_{FF}$) is calculated as described above:

$$V_{FF} = \frac{(\Delta\ CMD\ or\ \Delta\ JOINT)(6)}{GF} \quad (1a)$$

As mentioned, when formula (1a) is used for the tow velocity feed forward signal to modules 34, V$_{FF}$ is referred to as TV$_{FF}$ and is thus computed as follows:

$$TV_{FF} = \frac{(RRC)(6)}{GF} \quad (1b)$$

Thereafter, at process step 262, the command signal computed for the respective axis is provided to the appropriate module along with the associated V$_{FF}$, if appropriate, such as is described in connection with the redirect roller swivel command SCMD in aforesaid application Ser. No. 07/553,518.

It will be appreciated that the foregoing sequence of FIG. 6B occurs concurrently for each axis of machine 10. Hence, the various servo I/O's 128 will receive respective commands (Δ CMD or Δ JOINT) for the appropriate axes almost simultaneously whereupon movement in all axes will be coordinated. That is, movement in each axis will accelerate to a constant velocity so that the respective constant velocity or feed rate is attained for each axis at the same time. Deceleration is to likewise occur simultaneously. Main supervisor 122 thus calculates the various values of span and control signals S, N$_I$, N$_B$, N$_C$, and S$_D$ for each axis accordingly.

Additionally, the span length S (or, alternatively, angle of rotation) may be positive or negative indicating forward or reverse motion of the member in its respective axis. As a consequence, the command signals will also be either positive or negative to indicate the direction of movement.

Servo supervisor 124 also determines when to output the solenoid commands to solenoids 56, 58 and modules 34 as well as the TSC commands based upon whether the current move in the U-axis has been completed as determined from the user-programmed amount of such move. To this end, as seen in FIG. 6C, every 10 ms the U-axis trigger procedure is begun at process step 270 and proceeds to process step 272 whereat the U-axis position (U$_{POS}$) is calculated based upon the prior position plus the amount of commanded move Δ CMD in that axis. Although not shown, at step 272, the sequence of FIG. 6C may also "look-ahead" based upon rates of change of the Δ CMD signals on each pass of the sequence of FIG. 6C, taking into account delays in solenoid actuation and the like, to modify the calculated value of U$_{POS}$ to an expected position several (e.g., 20-50) ms later rather than at the current pass. The sequence then proceeds to decision step 274 whereat U$_{POS}$ is compared with the U-axis end point for that course of tow band 50 (there will usually be several "spans" in each course with a course being defined as all the moves of head 22 without lifting from mandrel 26) from the world coordinate input data. That end point value is referred to as the U-axis trigger point (U$_{TRIG}$) and is based either on the actual programmed value for the U-axis move at the beginning of a course (e.g., a so-called colon block), or computed from changes in the U-axis from the program values for each new span in the course. If U$_{POS}$ is not $\geq$ to U$_{TRIG}$, then the end (or anticipated end) of the course has not yet been achieved and the sequence of FIG. 6C ends as at 276. If, however, the test is positive at decision step 274, then the state of the solenoids 56, 58 and the tension setpoint command (TSC) may change. Hence, the sequence proceeds to process step 278 whereat the new solenoid state values and TSC, if they are changed from the prior course, are output to solenoids 56, 58 and to the modules 34 for the respective tows 24. Thereafter, the sequence of FIG. 6C ends.

Figure 7:
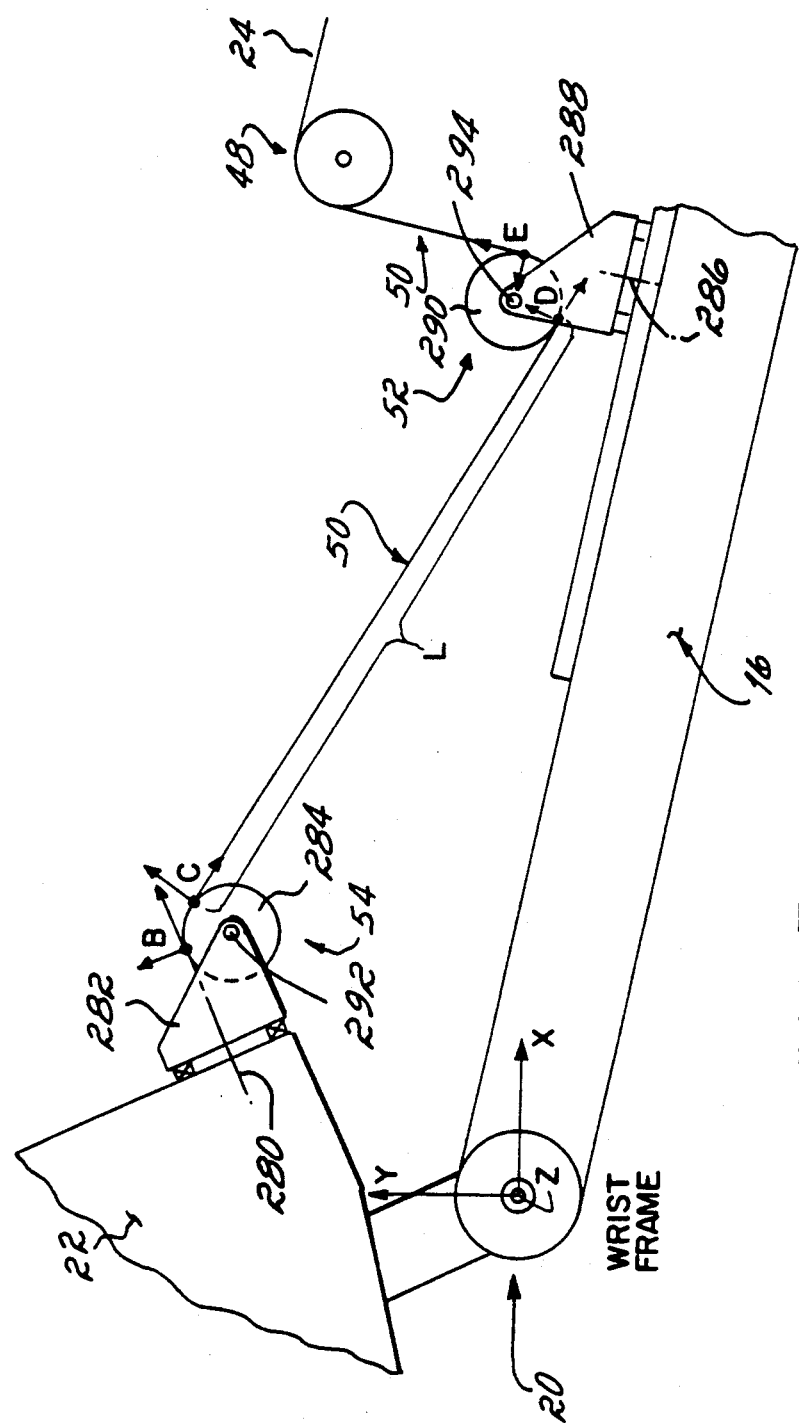
FIG. 7 is a diagrammatic view of the redirect rollers relative the wrist of the machine of FIG. 1.

It will be recalled that the user (not shown) inputs data in world coordinates and controller 120 develops from those coordinates commands for the various components of the machine. As mentioned, for purposes of positioning redirect roller assembly 52 and/or 54 and to determine RRC, various computations taking account movement of head 22 relative creel housing 32 are conducted at step 256 of FIG. 6B which will now be described in greater detail with reference to FIGS. 7 and 6D. The joint commands of pitch or bend (J$_j$) yaw or roll1 (I$_j$) and roll or ro112 (K$_j$) for wrist 20 are necessary, and may be seen as related to the local coordinate frame (local x, local y and local z axes) at wrist centerpoint W with the local z-axis pointing out of the page, as seen in FIG. 7. Knowledge of the wrist centerpoint W relative the creel housing 32 is used to compute the spatial relationships of redirect roller assemblies 52, 54 by performing the procedures of FIG. 6D referred to as the redirect roller sequence.

Before explaining the procedure of FIG. 6D, however, it is helpful to define some terms as follows:

| Term | Definition |
| --- | --- |
| 1. BFRAME | 4 by 4 orientation matrix relating fiber band 50 coordinate frame (local x, y and z axes) at point B to wrist centerpoint W, wherein point B lies on rotation axis 280 of bracket 282 of head side redirect roller assembly 54 and on the circumference of redirect roller 284 thereof. |
| 2. EFRAME | 4 by 4 orientation matrix relating fiber band 50 coordinate frame (local x, y and z axes) at point E to wrist centerpoint W, wherein point E lies on rotation axis 286 of bracket 288 of supply side redirect roller assembly 52 and on the circumference of redirect roller 290 thereof. |
| 3. CFRAME | 4 by 4 orientation matrix relating fiber band 50 coordinate frame |

| Term | Definition |
|---|---|
| | (local x, y and z axes) at point C to wrist centerpoint W, wherein point C lies along the circumference of redirect roller 284 at the center of the line of contact between fiber band 50 and roller 284. |
| 4. DFRAME | 4 by 4 orientation matrix relating fiber band 50 coordinate frame (local x, y and z axes) at point D to wrist centerpoint W, wherein point D lies along the circumference of redirect roller 290 at the center of the line of departure between fiber band 50 and roller 290. |

Each (—)FRAME orientation matrix above may take the form:

$$(-)\text{FRAME} = \begin{bmatrix} n_x & o_x & x & x \\ n_y & o_y & y & y \\ n_z & o_z & z & z \\ o & o & o & 1 \end{bmatrix} \quad (2)$$

wherein $n_x$, $n_y$ and $n_z$ are x, y and z coordinates, respectively, of a unit vector along local axis x at point (—); $o_x$, $o_y$ and $o_z$ are x, y and z coordinates, respectively, of a unit vector along local axis y at point (—); $\partial_x$, $\partial_y$ and $\partial_z$ are x, y and z coordinates, respectively, of a unit vector along local axis z at point (—); and $\rho_x$, $\rho_y$ and $\rho_z$ is a position vector pointing from the global frame origin (at wrist centerpoint W) to the local coordinate origin at point (—) referred to as the (—)P vector.

| | |
|---|---|
| 5. BTRANS | 4 by 4 transformation matrix of point B position with respect to placement head 22 when all angles of wrist 20 (D, E AND R) are set equal to zero. |
| 6. BT | Swivel angle of bracket 282. |
| 7. BC | Swivel angle of bracket 288. |
| 8. WT | Wrap angle of fiber band 50 about roller 284 between points B and C. |
| 9. WC | Wrap angle of fiber band 50 about roller 290 between points D and E. |
| 10. ROT$_{X\phi}$ | 4 by 4 rotation matrix about a local axis x by angle $\phi$ wherein |

$$\text{ROT}_{x\phi} = \begin{bmatrix} 1 & 0 & 0 & 0 \\ 0 & \cos\phi & -\sin\phi & 0 \\ 0 & \sin\phi & \cos\phi & 0 \\ 0 & 0 & 0 & 1 \end{bmatrix} \quad (3)$$

| | |
|---|---|
| 11. ROT$_{y\phi}$ | 4 by 4 rotation matrix about a local axis y by angle $\phi$ wherein |

$$\text{ROT}_{y\phi} = \begin{bmatrix} \cos\phi & 0 & \sin\phi & 0 \\ 0 & 1 & 0 & 0 \\ -\sin\phi & 0 & \cos\phi & 0 \\ 0 & 0 & 0 & 1 \end{bmatrix} \quad (4)$$

| | |
|---|---|
| 12. ROT$_{z\phi}$ | 4 by 4 rotation matrix about a local axis z by angle $\phi$ wherein |

$$\text{ROT}_{z\phi} = \begin{bmatrix} \cos\phi & -\sin\phi & 0 & 0 \\ \sin\phi & \cos\phi & 0 & 0 \\ 0 & 0 & 1 & 0 \\ 0 & 0 & 0 & 1 \end{bmatrix} \quad (5)$$

| | |
|---|---|
| 13. TR$_{xL}$ | 4 by 4 translation matrix along a local axis x by dimension L wherein |

$$\text{TR}_{xL} = \begin{bmatrix} 1 & 0 & 0 & L \\ 0 & 1 & 0 & 0 \\ 0 & 0 & 1 & 0 \\ 0 & 0 & 0 & 1 \end{bmatrix} \quad (6)$$

Turning now to FIG. 6D, the redirect roller sequence begins at step 256 and proceeds to decision step 300 whereat the sequence branches to initialization step 302 if machine 10 is at start up, i.e., tows 24 are first being applied. At step 302, variables BT, BC, WT and WC are all set equal to zero. If machine 10 is not at start up at step 300, or step 302 has been performed, the sequence proceeds to step 304 whereat BFRAME is computed by multiplying BTRANS with the rotation matrices about local axis x of roll1 angle (I), about local axis z by bend angle (J), and about local axis x by roll2 angle (K), as follows:

$$\text{BFRAME} = (\text{ROT}_{xIj})(\text{ROT}_{zJj})(\text{ROT}_{zKj})(\text{BTRANS}) \quad (7)$$

wherein BTRANS is a constant based upon the dimensional relationship between point B and wrist center W for machine 10 with a unit vector [0.301 −0.954 0.0] for fiber band 50 at local x with respect to the global frame; with a unit vector [0 0 −1] for fiber band 50 at local y with respect to the global frame; with a unit vector [0.954 0.301 0.0] for fiber band 50 at local z with respect to the global frame; and with the position of point B with respect to the global frame being a vector [17.828 −16.590 0.0] such that $$\overline{B}\text{TRANS} = \begin{bmatrix} 0.301 & 0 & 0.954 & 0 \\ -0.954 & 0 & 0.301 & 0 \\ 0 & -1 & 0 & 0 \\ 0 & 0 & 0 & 1 \end{bmatrix} \quad (8)$$

The result of formula (7) will have the solution for the BFRAME matrix as shown in Table I.

The sequence of FIG. 6D then proceeds to step 306 whereat CFRAME is computed by multiplying BFRAME with the rotation matrices about local axis x by angle BT and about local axis y by angle WT and with the translation matrices along the z axis by the positive and the negative values of the diameter (RD$_H$) of head side redirect roller 284 according to the formula:

$$\text{CFRAME} = (\text{BFRAME}')(\text{ROX}_{y(WT)})(\text{TR}_{z(RD_H)}) \quad (9)$$

wherein $$\text{BFRAME}' = (\text{BFRAME})(\text{ROT}_{x(BT)})(\text{TR}_{z(-RD_H)}) \quad (10)$$

The result of formula (10) will have the solution for the BFRAME' matrix shown in Table I. The result of formula (9) will likewise have the solution for the CFRAME matrix shown in Table I.

The sequence proceeds to step 308 whereat DFRAME is computed by multiplying EFRAME with the rotation matrices about local x by angle BC and about local y by angle WC and with translation matrices along the z axis by the positive and negative valves of the diameter ($RD_s$) of the supply side redirect roller 290 according to the formula:

$$DFRAME = (EFRAME')(ROT_{y(WC)})(TR_{z(-RDS)}) \quad (11)$$

wherein $$EFRAME' = (EFRAME)(ROT_{x(BC)})(TR_{z(RDS)}) \quad (12)$$

The result of formula (12) will have the solution for the EFRAME' matrix shown in Table I. The result of formula (11) will likewise have the solution for the DFRAME matrix shown in Table I.

The EFRAME matrix is a constant based upon the relationship between point E and wrist center W for machine 10 with a unit vector [0 1 0] for fiber band 50 at local x with respect to the global frame; with a unit vector [0 0 −1] for fiber band 50 at local y with respect to the global frame; with a unit vector [−1 0 0] for fiber band 50 at local z with respect to the global frame; and with the position of point E with respect to the global frame being a vector [55.831 14.469 0.0] such that $$EFRAME = \begin{bmatrix} E_{11} & E_{12} & E_{13} & E_{14} \\ E_{21} & E_{22} & E_{23} & E_{24} \\ E_{31} & E_{32} & E_{33} & E_{34} \\ 0 & 0 & 0 & 1 \end{bmatrix} = \begin{bmatrix} 0 & 0 & -1 & 55.831 \\ 1 & 0 & 0 & 14.469 \\ 0 & -1 & 0 & 0 \\ 0 & 0 & 0 & 1 \end{bmatrix} \quad (13)$$

The sequence of FIG. 6D then proceeds to step 310 whereat an updated value for the swivel angle BT of bracket 282 is computed such that a plane containing point B, the centerpoint of axis 292 of roller 284, and point D is perpendicular a vector for fiber band 50. The updated value of angle BT is found by setting the cross product of the fiber band vector and the vector from point D to point B equal to zero such that:

$$BT = \tan^{-1} \frac{-[B_{12}(DP(1) - B_{14}) + B_{22}(DP(2) - B_{24}) + B_{32}(DP(3) - B_{34})]}{B_{13}(DP(1) - B_{14}) + B_{23}(DP(2) - B_{24}) + B_{33}(DP(3) - B_{34})} \quad (14)$$

where the values $B_{ab}$ are from the BFRAME matrix computed at step 304 and where the point D position vector is [DP(1) DP(2) DP(3)] utilizing the [$p_x\ p_y\ p_z$] DP vector values from the DFRAME matrix computed at step 308. The sequence then proceeds to determine whether angle BT is such that head redirect roller 284 would point toward supply redirect roller 290. To this end, a value of BROT is computed at step 312 such that $$BROT = (BFRAME)(ROT_{x(BT)}) \quad (15)$$

with the newly calculated value for BT. The result of formula (15) will have the solution for the BROT matrix shown in Table I. Thereafter, the dot product (BDOTPRO) between the local z vector at B and the vector pointing from point E to point B is computed at step 314 based upon the $\rho$ vector of the constant EFRAME matrix, and the $\partial$ and $\rho$ vectors of the BROT matrix as follows:

$$\begin{aligned}BDOTPRO = &\ (-B_{12}\sin BT + B_{13}\cos BT)(B_{14} - 55.831) + \\ &\ (-B_{22}\sin BT + B_{23}\cos BT)(B_{24} - 14.469) + \\ &\ (-B_{32}\sin BT + B_{33}\cos BT)(B_{34} - 0.0)\end{aligned} \quad (16)$$

The computed value of BDOTPRO is then tested at decision step 316 and if it is less than zero, redirect roller 284 would be pointing the wrong direction, so BT is corrected by adding 180° at step 318, thus:

$$BT = BT + 180° \quad (17)$$

If BDOTPRO is not less than zero at step 316, or after correcting BT at step 318, an updated value of WT is computed by first recomputing BFRAME' at step 320 by recomputing formula (10) with the newly computed value of BT and then computing WT at step 322 in a two step iteration wherein the following formula is performed twice:

$$WT = WT - \frac{(\sin WT)(C1) + (\cos WT)(C2) + RD_H}{(\cos WT)(C1) - (\sin WT)(C2)} \quad (18)$$

with the value for WT computed after performing formula (18) the first time being used to compute a final value of WT the second time formula (18) is performed so as to approximate two loops through a Newton Raphson search; and wherein $$C1 = B_{11}'(B_{14}' - DP(1)) + B_{21}'(B_{24}' - DP(2)) + B_{31}'(B_{34}' - DP(2)) \quad (19)$$

and $$C2 = B_{13}'(B_{14}' - DP(1)) + B_{23}'(B_{24}' - DP(2)) + B_{33}'(B_{34}' - DP(2)) \quad (20)$$

from the newly computed BFRAME' matrix and the $\rho$ vector of the DFRAME matrix computed at step 308.

The sequence then proceeds to step 324 whereat CFRAME is recomputed using formula (9) with the newly computed values for BT and WT, and then to step 326 whereat an updated value for the swivel angle BC of bracket 288 is computed such that a plane containing point C, the centerpoint of axis 294 of roller 290, and point E is perpendicular a vector for the fiber band 50. The updated value of angle BC is found in a manner similar to the updated value of BT computed at step 310, i.e., by setting the cross product of the fiber band vector and the vector from point E to point C equal to zero such that $$BC = \tan^{-1} \frac{-[E_{12}(CP(1) - E_{14}) + E_{22}(CP(2) - E_{24}) + E_{32}(CP(3) - E_{34})]}{E_{13}(CP(1) - E_{14}) + E_{23}(CP(2) - E_{24}) + E_{33}(CP(3) - E_{34})} \quad (21)$$

where the values $E_{ab}$ are from the constant EFRAME matrix and where the point C position (CP) vector is [CP(1) CP(2) CP(3)] utilizing the [$p_x p_y p_z$] vector values from the CFRAME matrix recomputed at step 324.

The sequence then proceeds to determine whether angle BC is such that redirect roller 290 would point toward redirect roller 284. To this end, a value of EROT is computed at step 328 such that $$\text{EROT} = (\text{EFRAME})(\text{ROT}_{x(BC)}) \quad (22)$$

with the newly calculated value for BC. The result of formula (22) will have the solution for the EROT matrix shown in Table I. Thereafter, the dot product (EDOTPRO) between the local z vector at E and the vector pointing from point E to point B is computed at step 330 based upon the $\rho$ vector of the constant EFRAME matrix and the $\partial$ and $\rho$ vectors of the EROT matrix as follows:

$$\begin{aligned}
\text{EDOTPRO} = & \;(-E_{12}\sin BC + E_{13}\cos BC)(E_{14} - 55.831) + \\
& (-E_{22}\sin BC + E_{23}\cos BC)(E_{24} - 14.469) + \\
& (-E_{32}\sin BC + E_{33}\cos BC)(E_{34} - 0.0)
\end{aligned} \quad (23)$$

The computed value of EDOTPRO is then tested at decision step 332 and, if it is less than zero, then redirect roller 290 would be pointing the wrong direction, so BC is corrected by adding 180° at step 334, thus:

$$BC = BC + 180° \quad (24)$$

If EDOTPRO is not less than zero at step 332, or after correcting BC at step 334, an updated value of WC is computed by first recomputing EFRAME' at step 336 by recomputing formula (12) with the newly computed value of BC and then computing WC at step 338 in a two step iteration wherein the following formula is performed twice:

$$WC = WC - \frac{(\sin WC)(C3) + (\cos WC)(C4) + RD_S}{(\cos WC)(C3) - (\sin WC)(C4)} \quad (25)$$

with the value for WC computed after performing formula (25) the first time being used to compute a final value of WC the second time formula (25) is performed so as to approximate two loops through a Newton Raphson search; and wherein $$C3 = \quad (26)$$
$$E_{11}'(E_{14}' - CP(1)) + E_{21}'(E_{24}' - CP(2)) + E_{31}'(E_{34}' - CP(3))$$

and $$C4 = \quad (27)$$
$$E_{13}'(E_{14}' - CP(1)) + E_{23}'(E_{24}' - CP(2)) + E_{33}'(E_{34}' - CP(3))$$

from the newly computed EFRAME' matrix and the $\rho$ vector of the CFRAME matrix recomputed at step 324.

The sequence then proceeds to step 340 whereat DFRAME is recomputed using formula (11) with the newly computed values for BC and WC. Thereafter, the sequence proceeds to step 342 to compute the new tow length (TL) according to the formula:

$$TL = L + W_C + W_H \quad (28)$$

wherein L is the fiber tow length between points D and C on rollers 290 and 284, respectively, and is calculated from the spatial relationship of roller assemblies 52, 54 by the formula:

$$L = \sqrt{(D(x) - C(x))^2 + (D(y) - C(y))^2 + (D(z) - C(z))^2} \quad (29)$$

with D(n) being the scalar quantity from the DP vector for axis n and C(n) being the scalar quantity from the CP vector for axis n; $W_c$ is the amount of tow wrapped around roller 290 accordingly to the formula:

$$W_C = WC \cdot RD_S \quad (30)$$

and $W_H$ is the amount of tow wrapped around roller 284 according to the formula:

$$W_H = WT \cdot RD_H \quad (31)$$

After computing TL, the value of RRC is computed at step 344 according to the change in TL from the last pass through the sequence of FIGS. 6B and 6D according to the formula:

$$RRC = TL_{CURRENT} - TL_{LAST} \quad (32)$$

The value for RRC is then available for calculating $TV_{FF}$ at process step 250 in the sequence of FIG. 6B while the values of WT and WC are available for use in that sequence to control the swivel angle(s) of redirect roller assembly 52 and/or 54 as described in detail in aforesaid application Ser. No. 07/553,518. Although controller 120 is shown as performing the above matrix multiplications, where certain values are zero or 1, the results need not be computed. Similarly, where only partial results are needed, the entire matrix multiplication need not occur.

Figure 8:
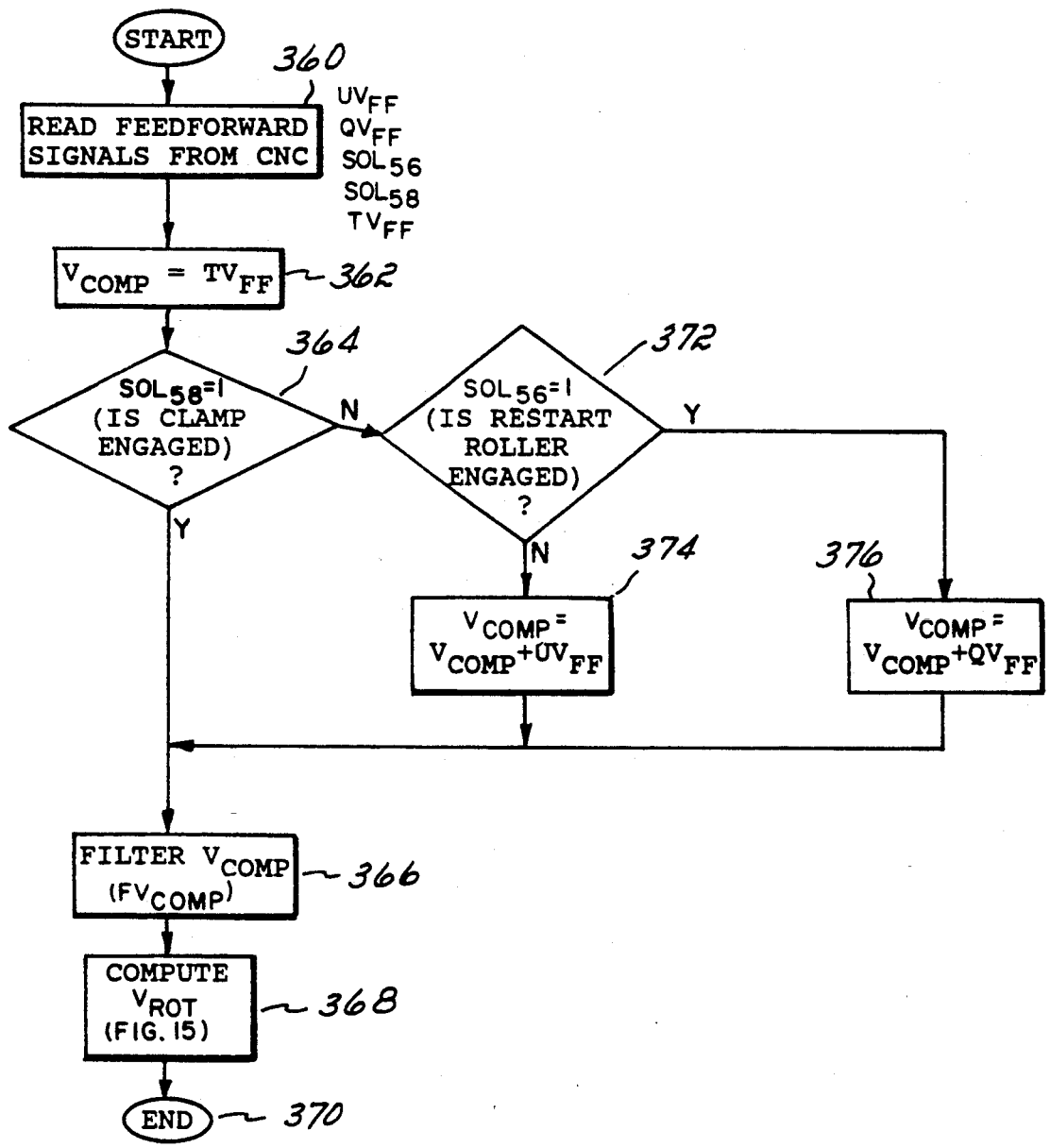

Turning now to FIGS. 8-18, the sequence of operations performed by a tensioner module 34 will now be described. Turning first to FIG. 8, once every 10 ms, local processor 162 of tensioner module 34 examines com link 160 at process step 360 of FIG. 8 to obtain the signals from CNC 120 which are to be used in the tension feed forward command $V_{ROT}$ by which to anticipate control of tension on tow 24 in accordance with the principles of the present invention. To this end, at step 360, data corresponding to the state of solenoids 56, 58 and the $V_{FF}$ commands for the U- and Q-axes associated with the tow 24 being controlled by that tensioner module 34, as well as the tow velocity feed forward command signal $TV_{FF}$ are obtained from com link 160. The sequence of FIG. 8 then proceeds to step 362 whereat a composite feed forward velocity value ($V_{COMP}$) is set equal to the value of $TV_{FF}$ and the sequence proceeds to decision step 364 where the state of solenoid 58 is examined. If solenoid 58 is activated, then the cut/clamp mechanism is engaged and tow 24 should not be paying out of head 22 (in which event there should be no modification of the value of $V_{COMP}$), so the sequence proceeds to step 366 whereat the value of $V_{COMP}$ is digitally filtered through a first order, low pass, infinite impulse response (IIR) filter with a frequency cut-off of 10 Hz to produce a filtered value of $V_{COMP}$ ($FV_{COMP}$). The sequence then proceeds to step 368 whereat the angular velocity feed forward component ($V_{ROT}$) to drive motor 40 in anticipation of tow 24 payout is calculated according to the formula:

$$V_{ROT} = \frac{FV_{COMP} \cdot KLA}{R_{SPOOL}} \quad (33)$$

wherein KLA is equal to the gear ratio (3.11) divided by $2\pi$ and $R_{SPOOL}$ is equal to the radius of spool 38 as computed at step 432 of FIG. 9 as will be described hereinafter. Thereafter, the sequence of FIG. 8 ends as at 370.

If, at decision step 364, solenoid 58 was not actuated, then tow 24 may be paying off of spool 38 in which event the value of $V_{COMP}$ may need to be adjusted. To this end, the sequence would proceed to decision step 372 whereat the state of restart roller solenoid 56 is examined. If restart roller 56 is not actuated, then tow 24 is not being driven out in the Q-axis and any tow payout from head 22 would be along the U-axis. Accordingly, the sequence proceeds to process step 374 whereat the value of $V_{COMP}$ is incremented by the value of $V_{FF}$ for the U-axis ($UV_{FF}$) and the sequence proceeds to steps 366 and 368 to filter and translate the updated $V_{COMP}$ to $V_{ROT}$ as previously described. On the other hand, if at decision step 372, solenoid 56 was actuated, there could be motion of tow 24 in the Q-axis. Accordingly, the sequence proceeds from decision step 372 to process step 376 whereat the value of $V_{COMP}$ is updated by the value of $V_{FF}$ for the Q-axis ($QV_{FF}$) followed by filtering and translation at steps 366 and 368 as previously described.

Tensioner module 34 also performs a servo control sequence by which to configure the servo control and by which to control tension on tow 24 in accordance with the principles of the present invention. To this end, as shown in FIG. 9, the servo sequence begins every 2 ms at process step 400 and proceeds to process step 402 to read the feedback data from sensors 94 and 98 and resolver 172 by obtaining the actual tension value ($T_A$) from sensor 98 as read by interface 182, the actual tow payout position ($T_P$) sensed by hall effect sensor 94 from rotation of sensor roller 88 and as received by interface 180, and actual motor shaft rotation ($M_R$) sensed by resolver 172 as read through I/O port 174. The tension data obtained from sensor 98 may be tested and an alert set if the tension is not within acceptable limits and/or is not stable, e.g., the signal is oscillating. Also at process step 402, the output tension (or torque) command (both referred to herein as TC) computed on the previous pass through the servo sequence of FIG. 9 is output through driver interface 176 to motor 40 to adjust tension on tow 24.

Figure 9:
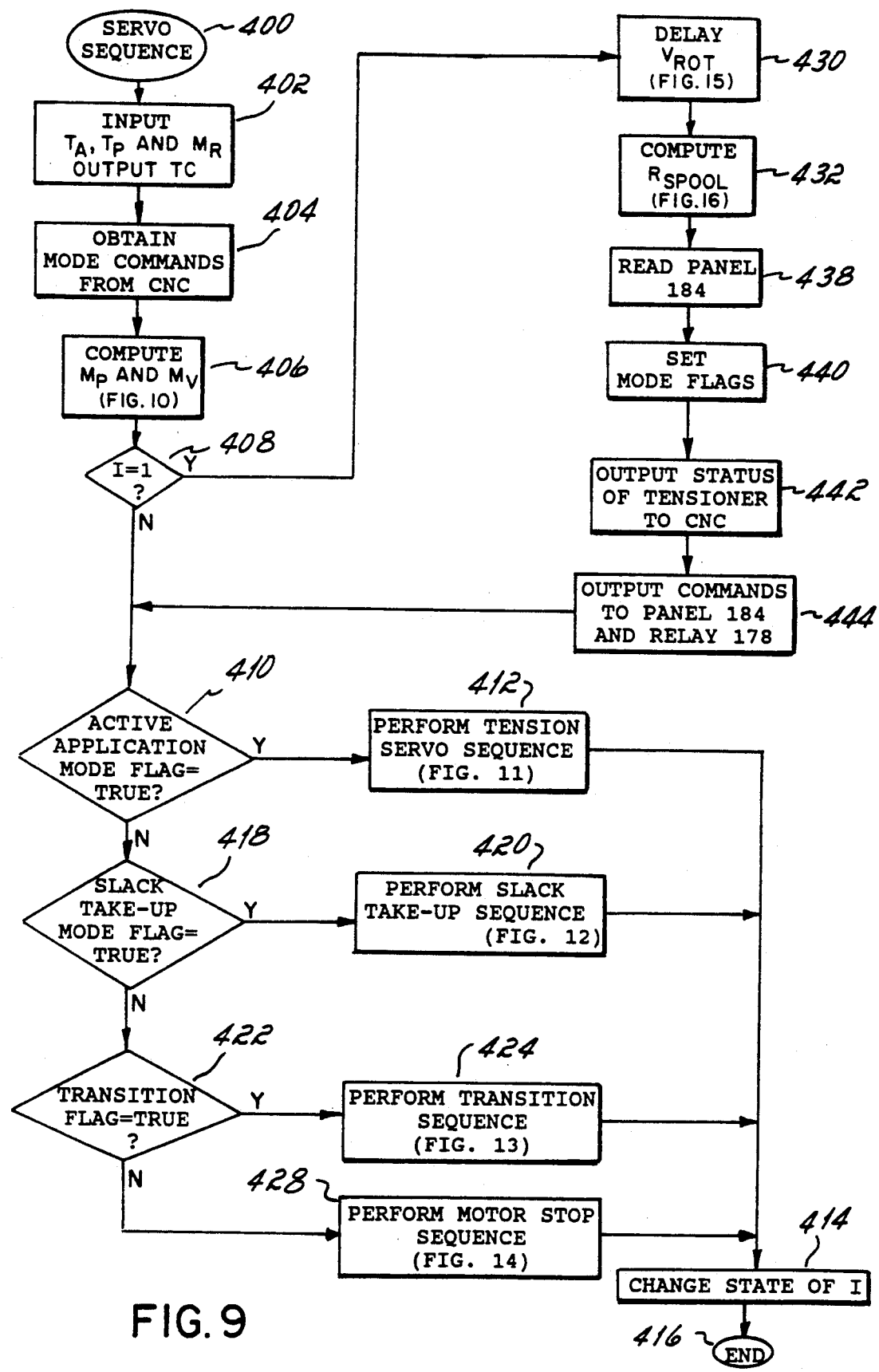

The servo sequence of FIG. 9 proceeds to process step 404 whereat the mode commands from CNC 120 are read out of com link 160. These mode commands represent commands from controller 120 to indicate whether module 34 is to go into the slack take-up or safe mode or go into the active application mode. After obtaining the mode commands at step 404, the sequence proceeds to motor sequence step 406 whereat the data ($M_R$) from resolver 172 are used to calculate motor shaft position ($M_P$) and motor shaft velocity ($M_V$). As will be described in greater detail in connection with FIG. 10, motor shaft position is used to compute the radius of spool 38 at process step 432 (FIG. 16) and the motor shaft velocity is used as a velocity feedback signal in an inner velocity servo loop for tension control in the active application mode.

As certain of the computations of the servo sequence need only occur every 4 ms, i.e., on every other pass through the servo sequence of FIG. 9, the burden on local processor 162 is reduced by skipping those computations on every second pass through the sequence. Consequently, at decision step 408, a test is made to see if the sequence of FIG. 9 is in the first or second of each pair of passes by testing the first pass or iteration flag (I) to see if it is true (=1) or false (=0). If false, several computational steps are skipped and the sequence proceeds instead to decision step 410 whereat it is determined whether the module is in the active application mode. If yes, the servo control is configured for closed loop tension operation with a tow payout velocity feed forward component and/or an inner velocity loop in accordance with the principles of the present invention. To this end, the sequence proceeds to step 412 to perform a tension servo procedure which will be described in connection with the flow charts of FIG. 11, and then proceeds to process step 414 to change the state of first pass flag (if I=1, change to I=0; if I=0, change to I=1) and the servo sequence ends as at step 416 to await the next pass through the sequence. On the other hand, if module 34 was not in the active application mode at step 410, the sequence proceeds to decision step 418 whereat it is determined whether module 34 is in the slack take-up mode. If yes, the servo control is configured for open loop or pseudo closed loop tension operation and in a low power mode. To this end, the sequence proceeds to step 420 to perform the slack take-up procedure as will be discussed in detail in connection with the flow charts of FIG. 12 followed by performing step 414 to reverse the state of the first pass flag as described above.

If, at step 418, module 34 is not in the slack take-up mode either, then the sequence proceeds to decision step 422 wherein it is determined whether module 34 has been commanded to go out of the active application mode, in which event the active application mode flag then will have been set false as will be described and the transition flag set true. If a transition is called for, the sequence proceeds to process step 424 to perform the transition servo procedure of FIG. 13 followed by step 414 as above described. If, on the other hand, no such transition in mode is called for at decision step 422, the sequence proceeds to process step 428 to perform the drive power down or motor stop sequence such as is used during tow threading. The sequence of step 428 will be described in connection with FIG. 14. After the sequence of step 428, process step 414 would ensue to change the state of the first pass flag and the sequence of FIG. 9 would end.

As mentioned earlier, some computations are to occur every other pass through the servo sequence. To this end, if at decision step 408 I=1, the sequence would branch to process step 430 whereat the computed rotational tow velocity feed forward signal ($V_{ROT}$) is delayed to help coordinate tensioner movement with that of the machine axes. The delay sequence of step 430 will be described in greater detail below in connection with the flow chart of FIG. 15. After step 430, the radius of spool 38 is calculated at step 432. As will be described in greater detail in connection with the flow chart of FIG. 16, spool radius is computed from the distance the spool has rotated as determined from the motor shaft position ($M_P$) computed at step 406 and whether the tow has paid out enough length to make one complete revolution of sensor roller 88 as determined from the actual tow payout data ($T_P$). After computing spool radius at step 432, the servo sequence proceeds to process step 438 whereat panel switches 184 are read to determine whether module 34 is being instructed locally to go into the slack take-up mode. At step 438, other options may be entered such as to unchuck spool 38 or even turn module 34 off. After reading switches 184, the mode signals from CNC 120 and switches 184 are placed into various flags to be used in decision steps 410, 418, and 422. To this end, if module 34 is not in the active application mode but is instructed to go to that mode, the related flag is initially set false and the slack take-up mode flag set true along with a request-for-active-application-mode flag set true. After performing the appropriate sequence in the slack take-up mode as will be described, the active application mode flag will be set true (step 440) for use at decision step 410 in a subsequent pass through the servo sequence of FIG. 9. Similarly, if module 34 is in the active application mode and is instructed to go to the safe or slack take-up mode, the active application mode and slack take-up mode flags are set false and the transition flag set true. After performing the appropriate sequences in the transition mode, the slack take-up mode flag will be set true to cause the slack take-up sequence to be undertaken on the next pass through the sequence of FIG. 9.

The sequence of FIG. 9 continues to process step 442 whereat the status of module 34 based on the mode flags (e.g., whether in alert, slack take-up, transition or active application mode) is output to CNC 120. Also, the tow tension is periodically output to CNC 120 at step 442 (such as once every 40-50 passes) and is preferably based on the average tow tension since the last time that data was output such as every 96 ms. At step 444, commands are output to panel 184 to blink or turn on or off the light(s) thereof to also indicate the status of module 34. Also at step 444, a command is output to relay 178 to place the relay in the high drive state or the low drive state based upon the mode commanded at step 440. Consequently, part of the servo control configuring occurs at 444 with other aspects of servo control configuration occurring in the procedures of steps 412, 420, 424, and 428 to be described hereinafter. After step 444, the sequence proceeds to decision step 410 to perform those operations as appropriate.

Figure 10:
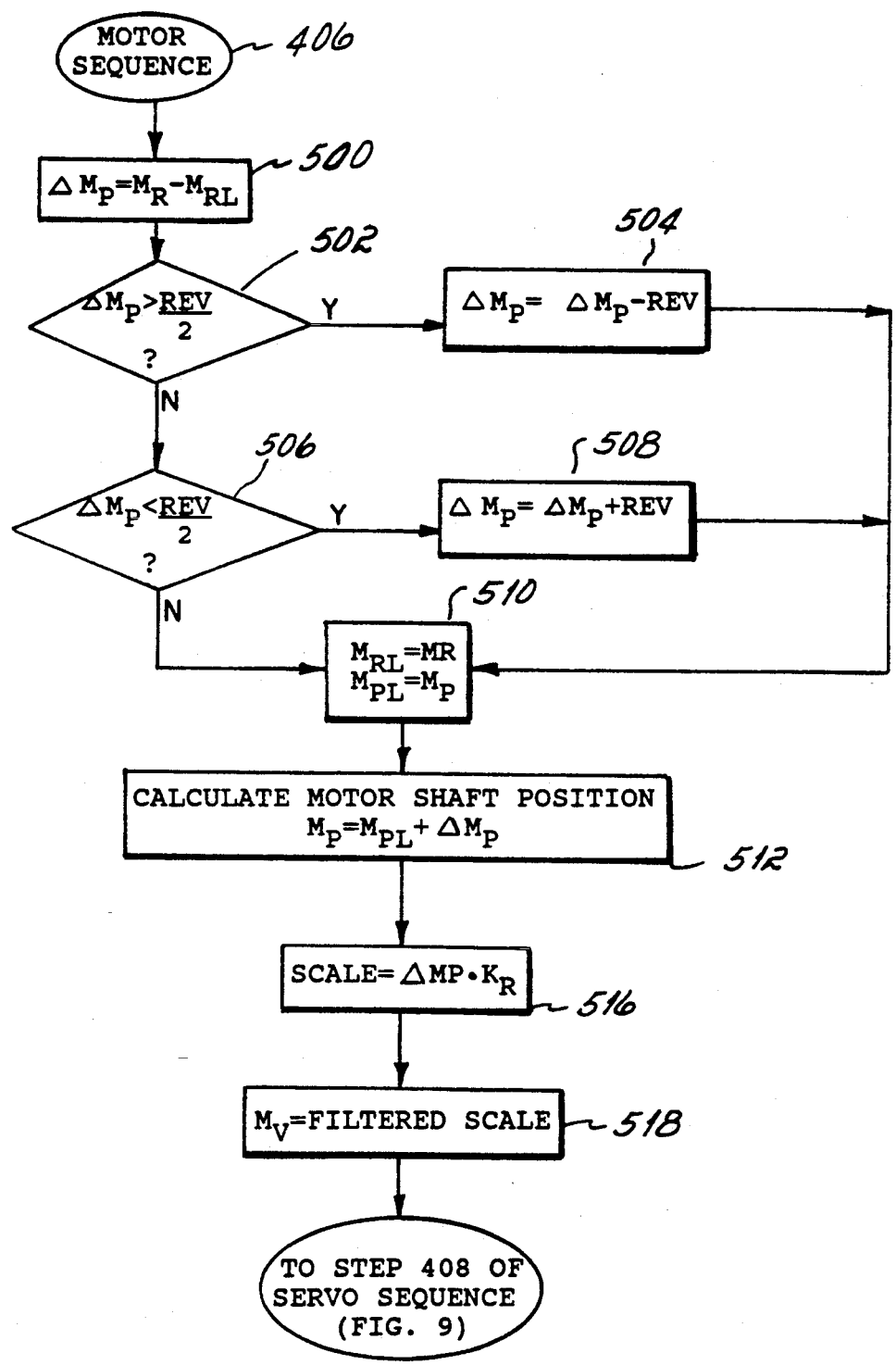

Turning now to FIG. 10, the motor sequence for computing motor shaft position and velocity of step 406 proceeds to step 500 wherein the change in shaft position ($\Delta M_P$) is computed as the difference of the current shaft position ($M_R$) read from resolver 172 minus the shaft position during the prior pass through the servo sequence ($M_{RL}$). As resolver 172 can only indicate shaft position over a single revolution of the shaft motor 40 (e.g., between 0° and 360° or 0 to 4096 pulses), process steps are provided by which to determine total shaft rotations (even over several hundred rotations of the shaft) by which to compute the amount of tow 24 that has payed out from spool 36. To this end, the sequence proceeds to decision step 502 wherein it is determined whether the shaft position has changed more than a predetermined amount equal to one-half a revolution of the shaft of motor 40 (e.g., has the change in angular shaft position been more than 180°). As will be appreciated, to prevent false data from resolver 172, and to maintain control over tow 24, commands to motor 40 are limited to prevent more than ½ revolution of the shaft every 2 ms. Preferably, the limit is about 0.16 revolutions every 2 ms.

If, at step 502, it is determined that $\Delta M_P$ is greater than one-half a revolution, it is assumed, due to the above-mentioned revolution limit, that the shaft has actually rotated in reverse so as to spool up some tow. Hence, the sequence proceeds to process step 504 whereat the shaft position increment $\Delta M_P$ is modified by subtracting a value equal to a full revolution of the shaft of motor 40. If, on the other hand, at decision step 502 the shaft position increment was less than one-half revolution, the sequence proceeds to decision step 506 whereat $\Delta M_P$ is compared to a negative one-half a revolution. If the amount of change is negative by less than that amount, the shaft is assumed to have rotated so as to spool-off tow. Hence, the sequence proceeds to process step 508 whereat the value of $\Delta M_P$ is modified by adding the value for a full revolution of the motor 40 shaft. After one of steps 504, 506 or 508, the sequence proceeds to step 510 wherein the current value of $M_R$ is substituted for the value of $M_{RL}$. The new shaft position ($M_P$) is then computed at process step 512 by summing the prior value of $M_P$ from the last pass through the sequence of FIG. 10 with the newly computed value of $\Delta M_P$.

The sequence of FIG. 10 continues to process step 516 whereat a scaled shaft RPM (SCALE) is computed equal to $\Delta M_P$ times an RPM constant ($K_R$) to scale the shaft position increment value to the actual motor shaft RPM. The value of SCALE may also be tested at this time to be sure the motor shaft is not actually rotating more than ½ a revolution every 2 ms. Preferably, a limit of 0.16 revolution every 2 ms is used. If SCALE is too large, an alert may be passed to CNC 120 and module 34 shut down. At step 518, SCALE is filtered through a first-order, low pass IIR filter with a cutoff of 80 Hz to produce the value of motor shaft velocity ($M_V$) to be used in the inner velocity loop control of motor 40 as will be described. Thereafter, decision step 408 of the sequence of FIG. 9 is undertaken as previously described.

Figure 13:
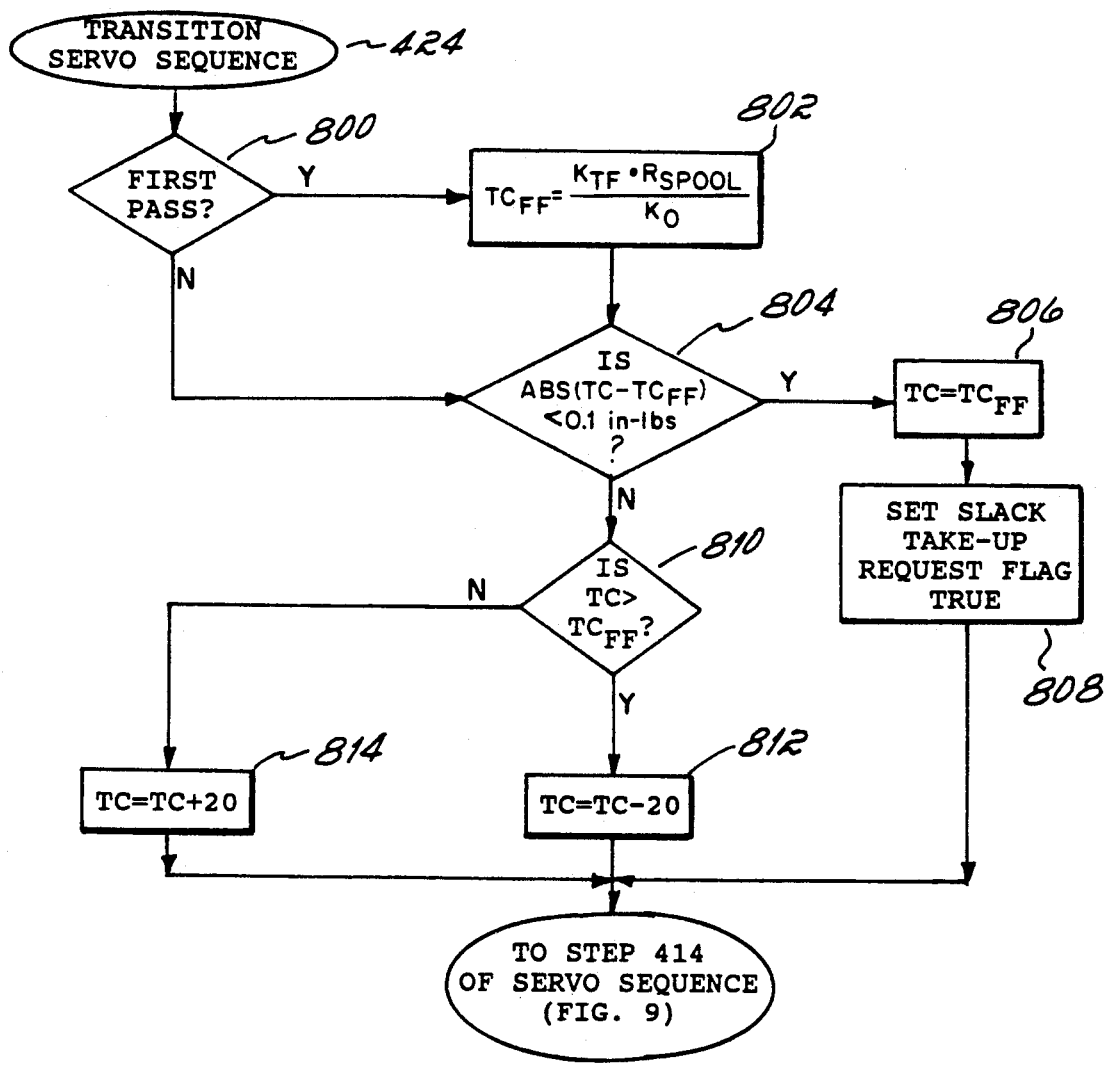
Figure 14:
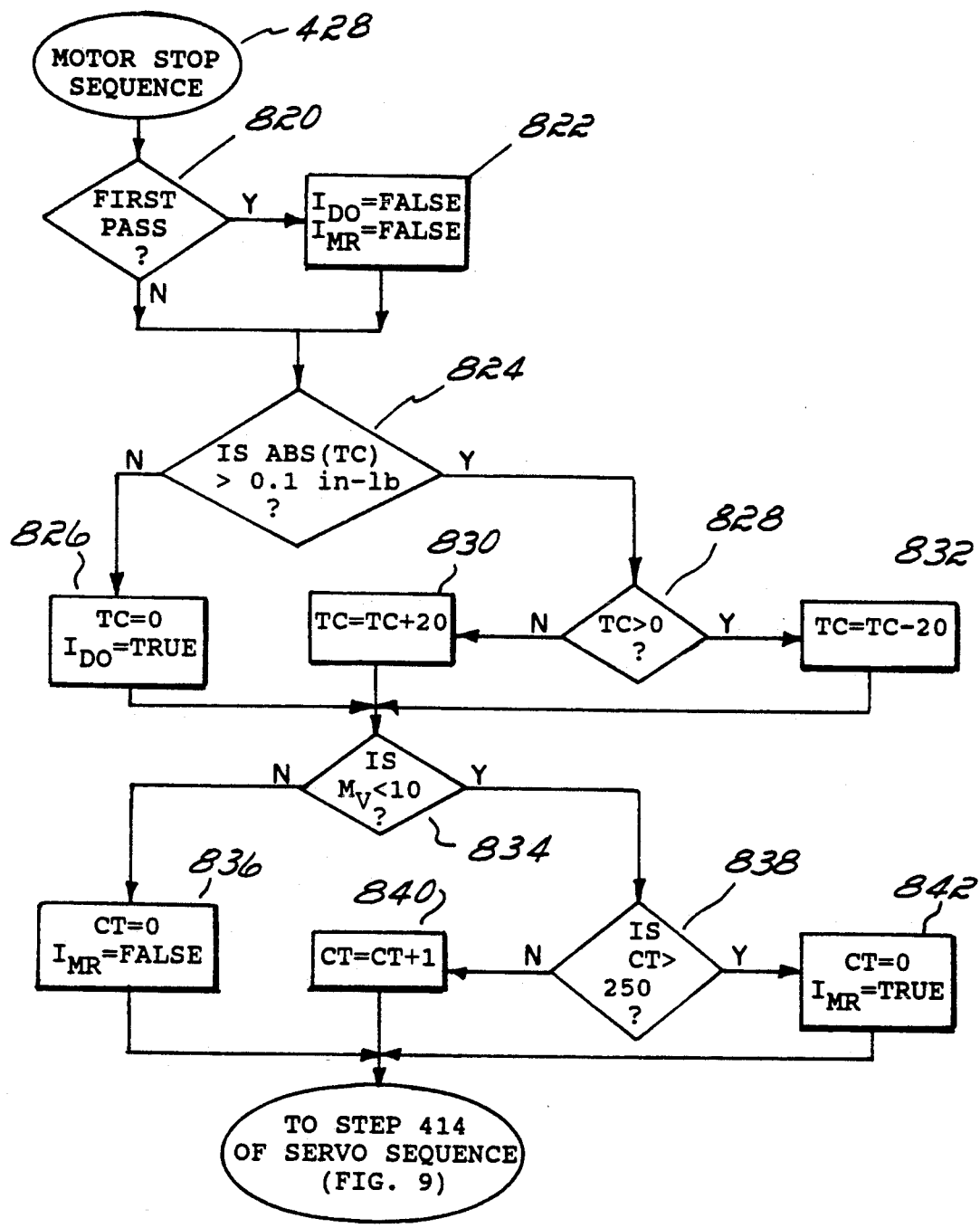
Figure 15:
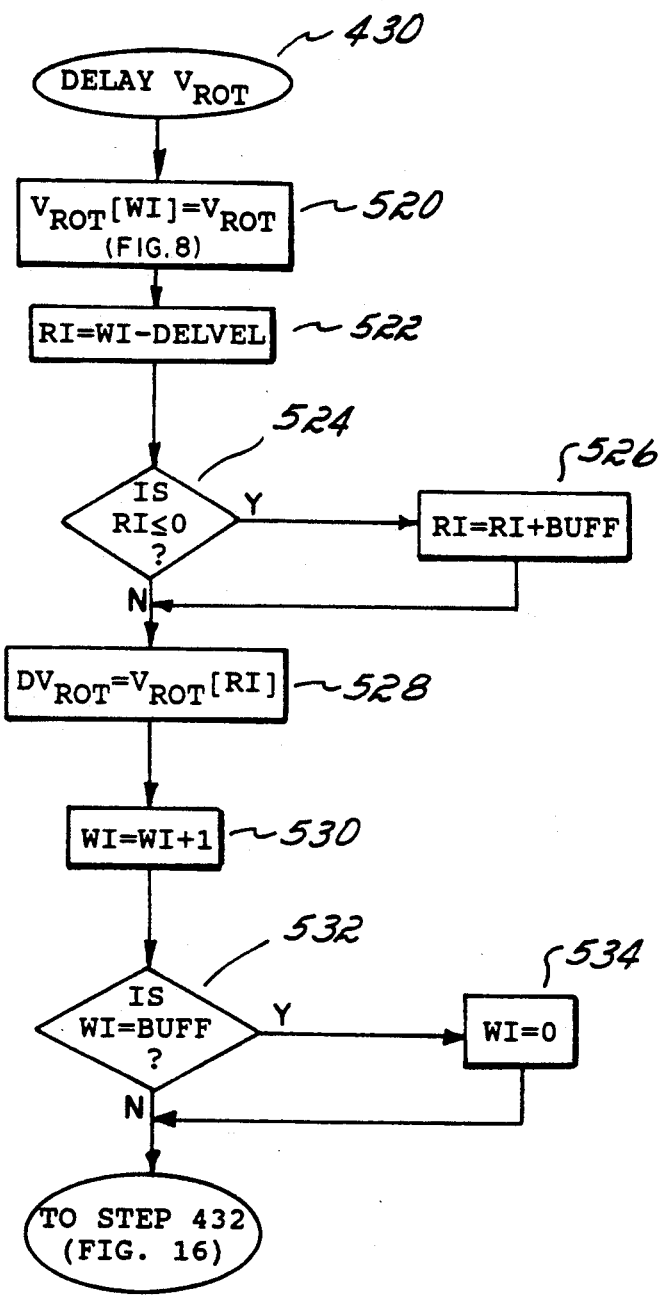
Figure 16:
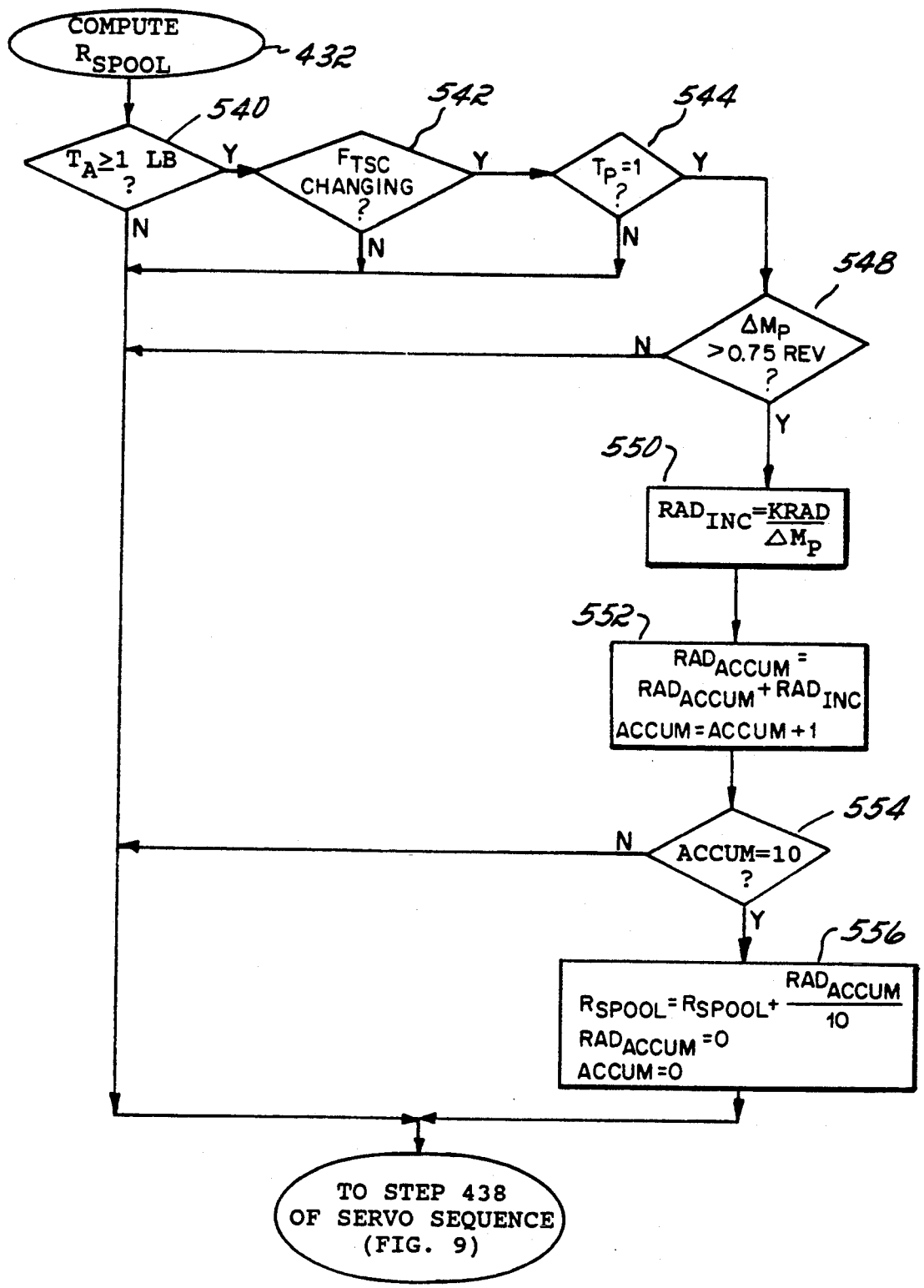

Before describing the various modes of operation of module 34 as represented by the flow charts of FIGS. 11-14, it will be beneficial to describe the computations of FIGS. 15 and 16 as the results thereof are computed once every 4 ms but are used every 2 ms in the sequence of FIGS. 11-14. Turning to FIG. 15, the procedure to delay the velocity feed forward signal at step 430 of FIG. 9 proceeds to step 520 to record once every 4 ms the value of $V_{ROT}$ which was computed once every 10 ms at step 368 in the sequence of FIG. 8. As a consequence, a buffer is loaded with several values of $V_{ROT}$, each value in each location or index of the buffer being referred to as $V_{ROT}[x]$ which is the value of $V_{ROT}$ in buffer location x. Additionally, $V_{ROT}$ is based on the command signals from CNC 120 which are computed one servo update prior to actually being used to move the various machine axes. Accordingly, when the tensioner module 34 receives the signals, the module must delay them to line them up with the commands given to module 34 for actual tension control so as to help coordinate the actual tensioner movement with the machine axes. To this end, at step 520, the then-current value of $V_{ROT}$ is stored in a location in the buffer identified by a write index value (WI), i.e., $V_{ROT}[WI] = V_{ROT}$. Thereafter, at process step 522, the value of a read index (RI) is set equal to the write index (WI) value minus a fixed delay value (DELVEL) correlated to the characteristics of the operation of machine 10 and the timing characteristics of operation of CNC 120 and module 34. In a preferred embodiment, the fixed delay value is 2 such that the value of $V_{ROT}$ to be used for subsequent tension control will be read out of a buffer location having a $V_{ROT}$ value from the 2nd prior pass through the sequence of FIG. 15.

After computing the read index, its value is tested at decision step 524 to be sure it is not zero or negative. If the result of process step 522 is zero or a negative number, the value of $V_{ROT}$ should be the most current value.

Hence, the read index is adjusted at process step 526 by the length (BUFF) of the buffer (in a preferred embodiment BUFF=8) and the sequence proceeds to process step 528 to determine the delayed value of $V_{ROT}$ (referred to as $DV_{ROT}$) which is equal to $V_{ROT}[RI]$. If RI was positive at step 524, the sequence proceeds directly to step 528.

After determining the value of $DV_{ROT}$, the sequence proceeds to process step 530 whereat the value of WI is incremented and compared at decision step 532 to the previously-mentioned length of the buffer. If, at step 532, WI has now been incremented to the length of the buffer, the value for the write index is reset to the first location of the buffer such as location 0 at step 534 and the sequence of FIG. 15 ends at step 432 of the sequence of FIG. 9. If, on the other hand, WI is not equal to the length of the buffer at step 432, the sequence of FIG. 15 ends without resetting the value of WI.

With reference to FIG. 16, after the velocity delay sequence of FIG. 15, the radius of spool 38 is to be computed. To this end, the sequence of FIG. 16 proceeds to decision step 540 whereat the value read from interface 182 for strain gauge sensor 98 at step 402 of FIG. 9 is evaluated to be sure tow 24 is under tension (e.g., $T_A$ is at least equal to 1 lb). If there is not sufficient tension, the spool radius calculation is not undertaken so the sequence of FIG. 16 ends by proceeding to step 438 of the servo sequence of FIG. 9. If, however, there is tension on tow 24 as would normally be expected during the active application mode and/or completion of the slack take-up mode, the sequence of FIG. 16 proceeds to decision step 542 wherein a test is made to see if tension is to be changing as the computation of spool radius should be made only when tension is not being commanded to change. The test of step 542 involves examining the value of the filtered tension setpoint command ($F_{TSC}$) (see step 602 of FIG. 11) to determine if tension is changing (either by comparison of $F_{TSC}$ to the current value of TSC or the prior value of $F_{TSC}$) in which event the tensioner system has not caught up with the commanded tension and compliant roller springs 68 may either be compressing or expanding changing the length of the tow strung between spool 38 and tow motion sensor 32 upsetting the spool radius computations. Consequently, if at step 542 the tension is changing, the sequence of FIG. 16 ends as above described. If, however, the filtered command tension value is constant, the sequence proceeds to step 544 whereat the data from resolver 180 associated with hall effect sensor 94 is evaluated to see if tow 24 pay-out or reel-up has rotated roller 88 far enough to bring magnet 96 over sensor 94 ($T_P=1$).

At step 544, if it is determined that tow 24 has not yet moved far enough (e.g., $T_P=0$), the sequence of FIG. 16 ends. If, however, tow 24 has moved sufficiently ($T_P=1$), the sequence proceeds to decision step 548 whereat the value of $\Delta M_P$ (such as from step 512 of FIG. 10) is evaluated to see if the motor shaft has turned sufficiently to provide a valid spool radius calculation (e.g., at least about 0.75 revolution or 3000 of the 4096 bits per revolution from resolver 172). If at step 548 it is determined that there has not been at least such a minimum move of the shaft, the sequence of FIG. 16 ends as previously described. Otherwise, the sequence proceeds to step 550 whereat a radius increment ($RAD_{INC}$) is calculated equal to a predetermined radius constant (KRAD) divided by $\Delta M_P$. The value of KRAD is selected to scale the radius increment to units of 0.001 inch and in a preferred embodiment is determined by the formula:

$$KRAD = \frac{(1000)(KLA)(\text{Roller 88 Diameter})(4096 \text{ bits/rev of Res. 172})}{} \quad (34)$$

The sequence of FIG. 16 then proceeds to process step 552 whereat the value of $RAD_{INC}$ is accumulated by computing the value of $RAD_{ACCUM}$ equal to the previous value of $RAD_{ACCUM}$ plus $RAD_{INC}$, and an accumulation counter (ACCUM) is incremented by 1. The sequence then proceeds to step 554 wherein a decision is made as to whether the value for $RAD_{ACCUM}$ has been updated ten (10) times, i.e., ACCUM = 10 such that the sequence of FIG. 16 has been completed through and including step 552 at least ten (10) times during the performance and operation of module 34. If not, the sequence ends. Otherwise, the sequence proceeds to step 556 whereat the actual radius ($R_{SPOOL}$) of spool 38 is calculated equal to the sum of the prior value of $R_{SPOOL}$ plus the average of the change in spool diameter (1/10 of $RAD_{ACCUM}$). The value of $RAD_{ACCUM}$ and ACCUM are then set equal to 0, whereupon the sequence ends.

With the foregoing information from the flow charts of FIGS. 15 and 16, reference may now be had to the flow charts of FIGS. 11-14 for a more thorough description of operation of module 34 in its various modes of operation. If module 34 is in the active application mode at step 410, relay 178 is in the drive state and module 34 is to generate the actual tension command (TC) to motor 40 including the tow feed forward and inner velocity loop components as will now be described with reference to the tension servo sequence of FIG. 11.

Figure 11:
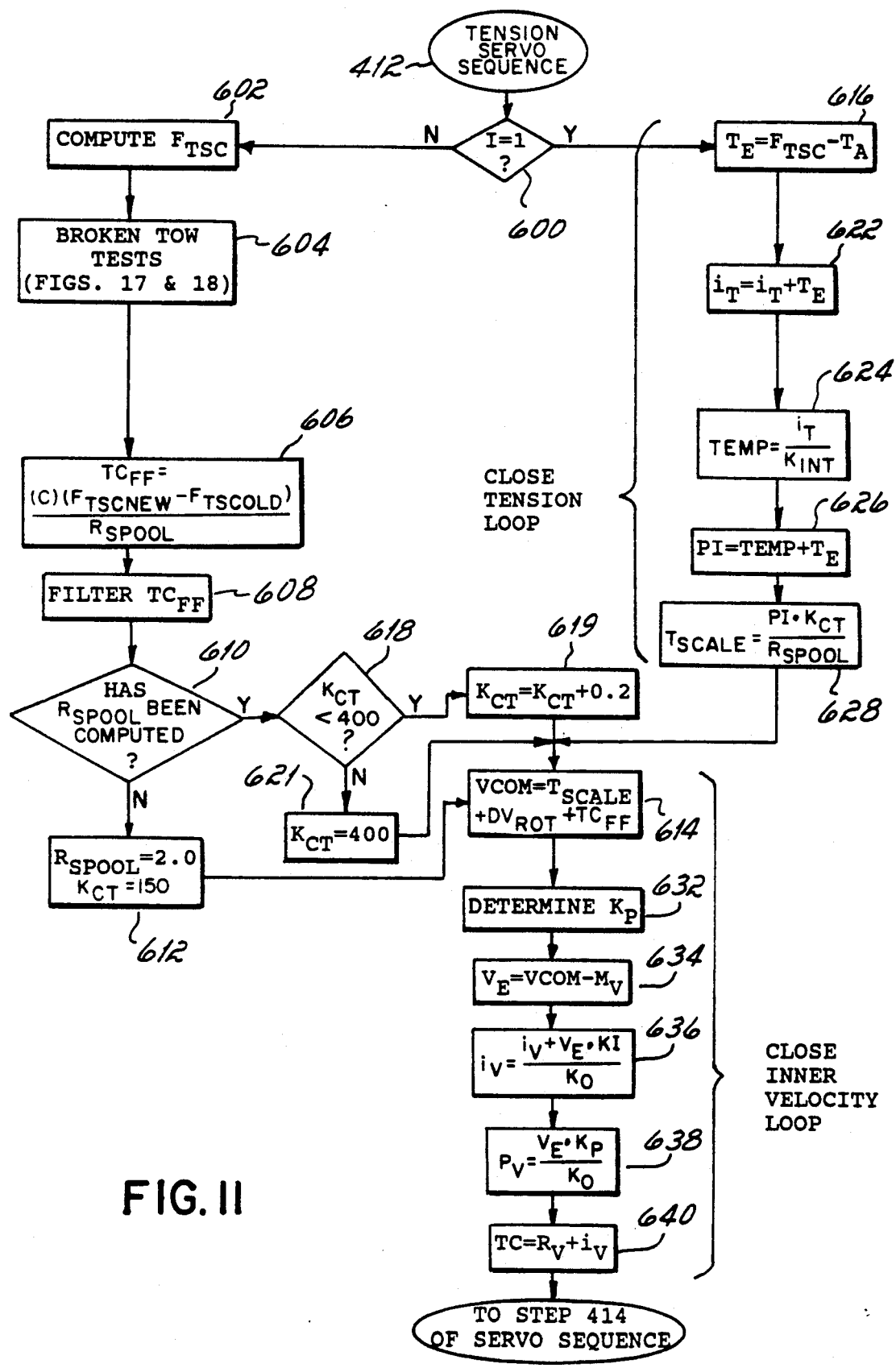

The tension servo sequence begins at step 412 of FIG. 9 and proceeds to decision step 600 of FIG. 11 where the first pass flag is tested to see if it is true or false. If I is false (=0), steps 430–444 above-described did not occur on this pass so there is more time available for local processor 162 to calculate the actual tension command. To this end, the sequence will branch to step 602 whereat the tension setpoint command (TSC) from CNC 120 is filtered through a second order, low pass, infinite impulse response (IIR) digital filter with a filter cut-off of 5 Hz to produce a filtered tension command signal ($F_{TSC}$). The sequence then proceeds to step 604 where tow 24 is checked to see if it is broken or has slipped. The broken tow tests of step 604 includes two tests, a gross broken tow test and a fine broken tow test. As will be described below in greater detail with reference to FIGS. 17 and 18, the gross broken tow test simply determines if spool 38 rewinds an excessive amount such as approximately six feet. Since rewinding can occur only normally when the machine wrist 22 moves around, the amount of rewind possible is typically only a few feet. If the tow were to break, the tension would take-up the slack and eventually rewind past the six foot limit raising the alert. The fine broken tow test, on the other hand, determines whether the spool has rotated more than would be expected by the $DV_{ROT}$ value based upon the feed forward signals from CNC 120 indicating slippage of tow 24. The slippage test may reveal an impending break in tow 24 or misapplication of tow which would lead to defective parts allowing the operator to make corrections therefor without scrapping the part or otherwise wasting resources.

After the broken tow tests are performed, the tension servo sequence proceeds to process step 606 whereat a feed forward command tension (TC$_{FF}$) is set equal to a constant (C) times the change in value of commanded tension (i.e., the filtered tension setpoint command or F$_{TSC}$ on the current pass minus the prior value of F$_{TSC}$ from the prior pass) all divided by R$_{SPOOL}$. The constant C is based upon the formula:

$$C = DIR \cdot \frac{(RATE)(KLA)(60 \text{ sec/min})(1000)}{(\text{Spring Rate of Springs 68})(K)} \cdot OS\% \quad (35)$$

where DIR is motor direction (e.g. 1 or −1), RATE is the sample rate (500/sec), the spring rate is 8 lbs/in, K is a scale factor for bit computations of processor 162 (K=223.68 bits/lb), and OS% is the amount of feed forward to use to reduce overshoot and is preferably 85%. The result in a preferred embodiment is C=7603 in the appropriate units for use by local processor 162. Then at process step 608, the feed forward value is filtered through a second order, low pass digital IIR filter with a cut-off of 25 Hz. The sequence of FIG. 11 then proceeds to decision step 610 whereat it is determined whether the radius of spool 38 has been computed. If not, a default radius and a default loop gain (R$_{SPOOL}$=2.0″;K$_{CT}$=150) are recalled from memory at step 612 to be used in closing the inner velocity loop and the tension loop which begins at steps 614 and 616 as will be described. Otherwise, the sequence of FIG. 11 branches from decision step 610 to decision step 618 whereat the tension loop gain (K$_{CT}$) is ramped up, if necessary, over several passes through the sequence of FIG. 11 to its full value of 400, for example. To this end, at decision step 618, K$_{CT}$ is compared to the full value therefor and, if it is less than that full value, the sequence proceeds to process step 619 to increment K$_{CT}$ by a small amount. Otherwise, the sequence proceeds to step 621 to limit K$_{CT}$ by setting it equal to the full value.

Referring back to step 600 of FIG. 11, if the first pass flag is true, which occurs once every 4 ms, the sequence of FIG. 11 would instead branch to step 616 to close the tension feedback loop as will now be described. To this end, a tension error value (T$_E$) is computed at step 616 equal to the prefiltered commanded tension computed at step 602 minus the current tension (T$_A$) from sensor 94. At process step 622, a tension loop integrater value (i$_T$) is set equal to the prior integrater value plus T$_E$ followed by process step 624 whereat a temporary value (TEMP) is set equal to the integrater value (i$_T$) divided by a tension integration loop attenuation constant (K$_{INT}$) for better scaling. In a preferred embodiment, K$_{INT}$=40. The sequence then proceeds to process step 626, to compute the proportional plus integral tension command value (PI) equal to TEMP plus TE. Finally, the tension loop is closed at process step 628 by computing a scaled torque output value (T$_{SCALE}$) as the product of PI times the tension loop gain (K$_{CT}$) representing compliance of the servo loop all divided by the radius (R$_{SPOOL}$) of spool 38 previously computed or assumed.

Every 2 ms, i.e., in each pass through the sequence of FIG. 11, the inner velocity loop is closed as will now be described. At process step 616, a velocity command value (VCOM) is computed equal to the sum of T$_{SCALE}$, the delayed feed forward value (DV$_{ROT}$) and the filtered commanded tension feed forward (TC$_{FF}$) from step 608. At process step 632, a velocity loop proportional gain constant (K$_P$), which is proportional to inertia of the tensioner system, is determined based upon the radius (R$_{SPOOL}$) of spool 38. The value of K$_P$ is a gain scheduling factor and may be obtained using the following formula:

$$K_P = \frac{(D_T)(\pi)(W_{SP})(R^4_{SPOOL} - R^4_{CHUCK})}{(2)(G)} + I_{CHUCK} \quad (36)$$

wherein D$_T$ is the density of the tow as wound on the spool, W$_{SP}$=the spool width, R$_{CHUCK}$ is the radius of the chuck, I$_{CHUCK}$ is the inertia of the chuck and G is the gravitational acceleration constant. Preferably, the value thus computed is scaled by an empirical constant to give the inner velocity loop a closed loop bandwith of 20 Hz. Alternatively, the K$_P$ values are pre-computed for different spool radii, such as in 0.1 inch steps, and may be obtained from a look-up table based upon where R$_{SPOOL}$ falls within a range of radii. In a preferred embodiment, K$_P$ is typically between 4000 and 32,000 for spool radii between 1.5 inches and 4 inches. The sequence then proceeds to process step 634 whereat the velocity loop error (V$_E$) is calculated equal to VCOM minus actual shaft velocity (M$_V$) computed at step 518 of motor sequence (FIG. 10). Velocity loop integrater value (i$_V$) is then computed at step 636 as the sum of the previous velocity loop integrater value plus loop error (V$_E$) times a velocity loop integrater constant (K$_I$) divided by a conversion constant (K$_O$) to place the value in units for use by driver interface 168. Typical values of K$_I$ and K$_O$ are 100 and 150, respectively.

After computing the velocity loop integration value, the sequence proceeds to process step 638 whereat a velocity loop proportional value (P$_V$) is set equal to V$_E$ times K$_P$ divided by the output unit conversion constant (K$_o$). Finally, at step 640, the value of the commanded tension (TC) is calculated equal to the sum of P$_V$ and i$_V$ which, from the foregoing, is seen to include a tow velocity feed forward component (V$_{ROT}$) based, in part, upon TV$_{FF}$ and an inner velocity closed loop portion all in conjunction with a closed loop tension servo control. The sequence of FIG. 11 then ends and the state of the first pass flag (I) is changed at step 414 of FIG. 9 as previously described.

Figure 17:
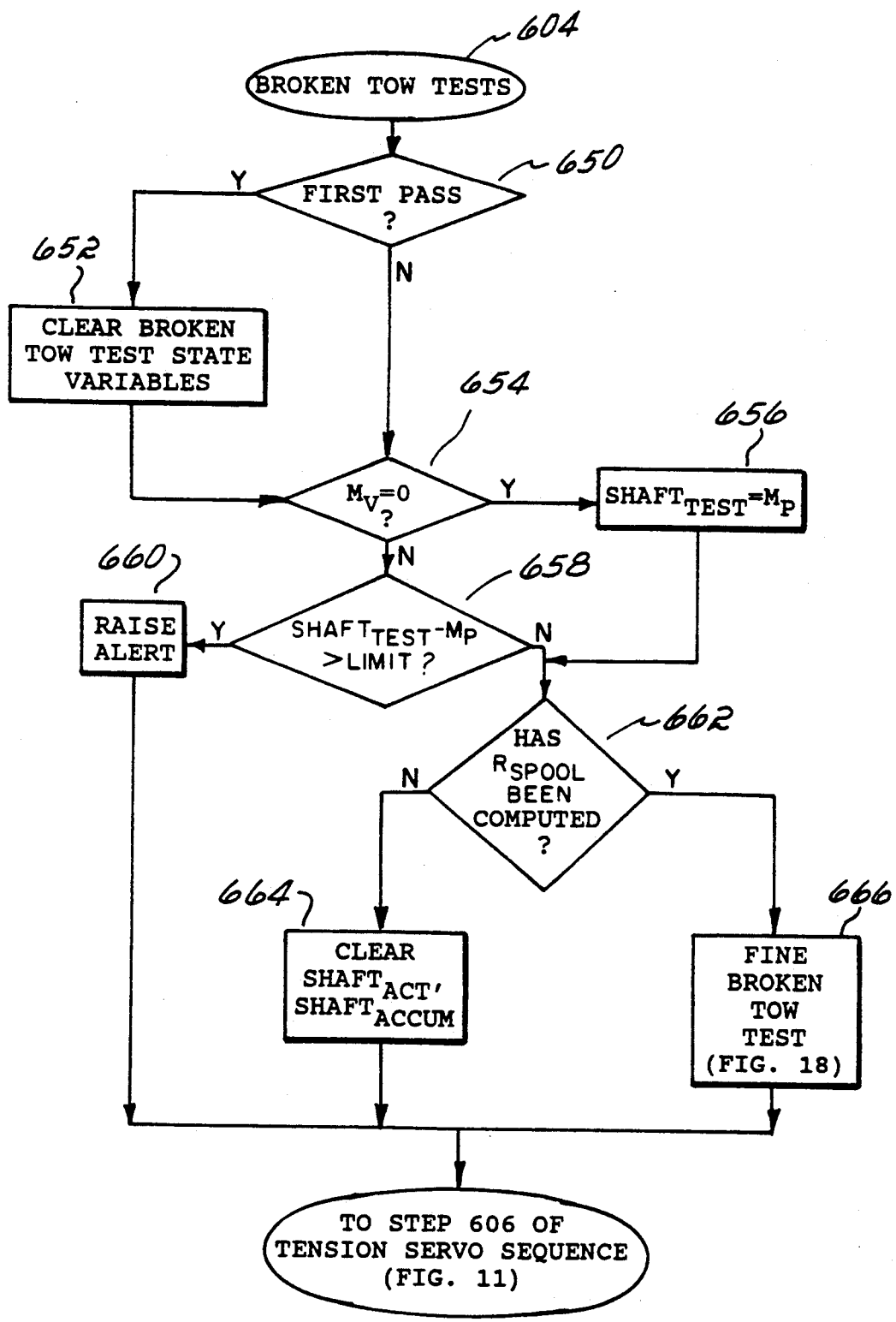
Figure 18A:
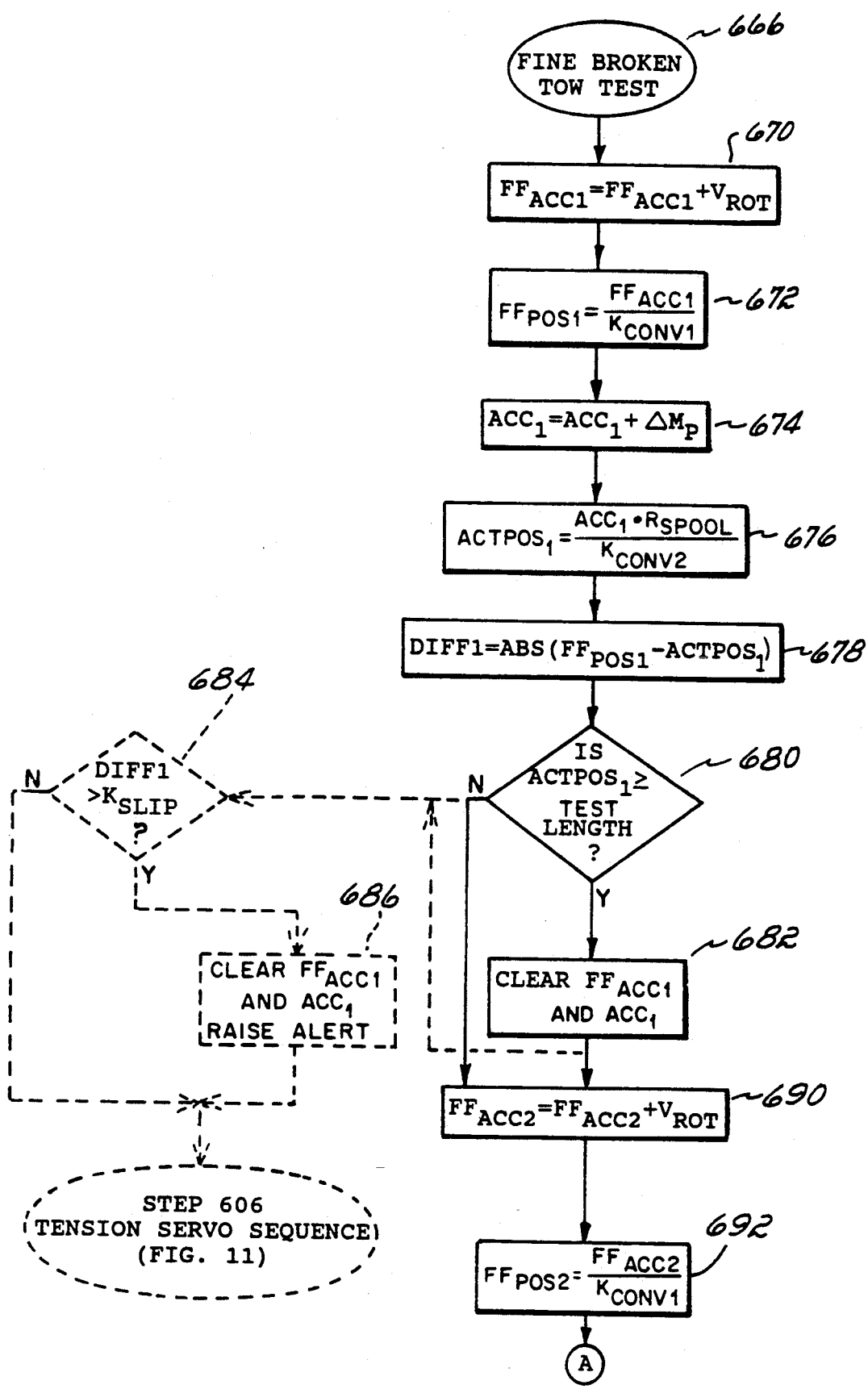
Figure 18B:
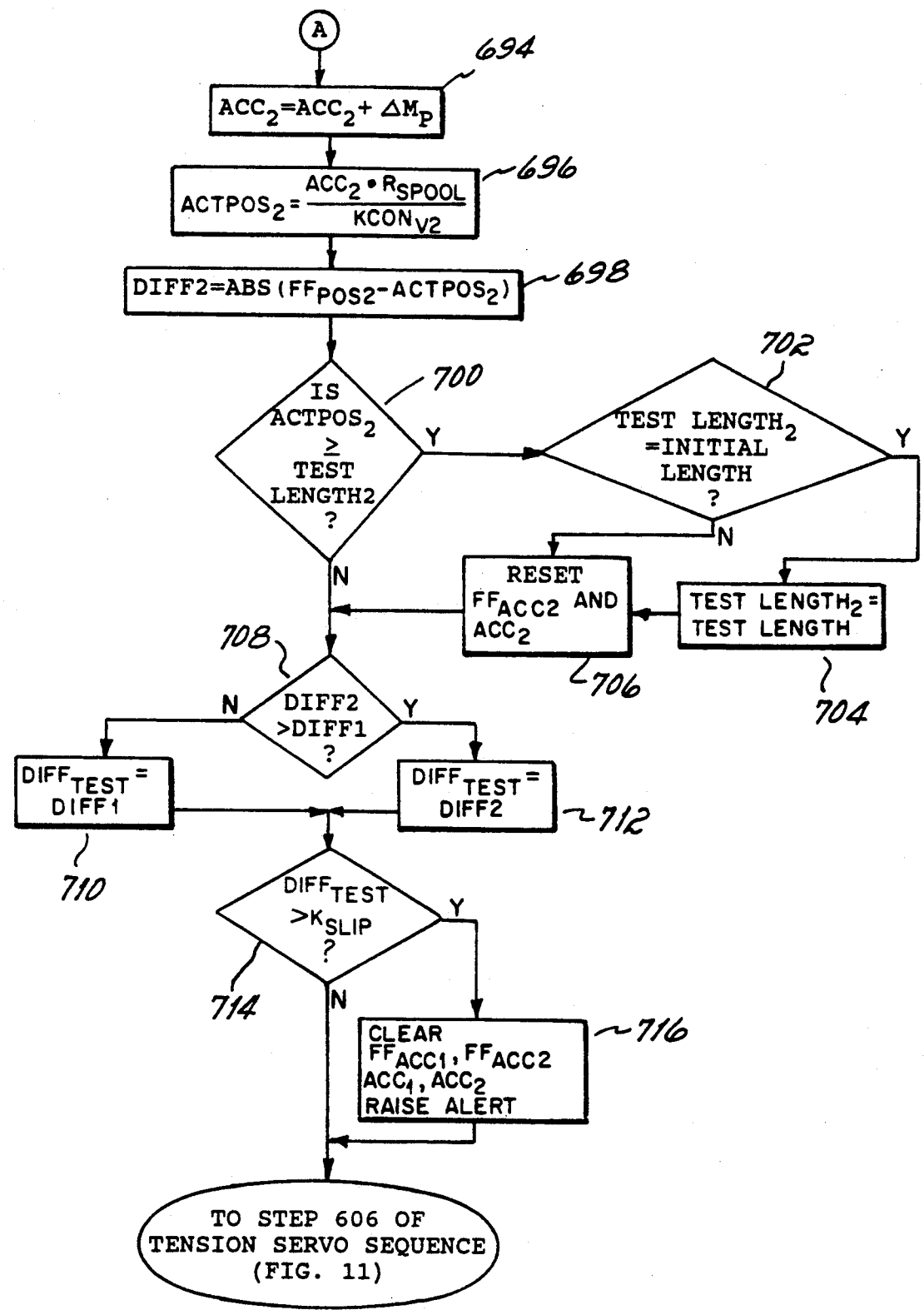

Before proceeding to describe the flow charts for operation in the other modes of module 34, description of the broken tow tests of step 604 of FIG. 11 will now be described with reference to FIGS. 17 and 18. To this end, the broken tow tests begin with decision step 650 whereat a test is made to see if this is the first time the broken tow tests are being performed (i.e., when module 34 first enters the active application mode). If yes, all of the state variables used in the broken tow tests (FF$_{ACC1}$; FF$_{ACC2}$; ACC$_1$; ACC$_2$; SHAFT$_{TEST}$ and TEST LENGTH$_2$) are cleared or reset (TEST LENGTH$_2$ is set, for example, to 6 inches) at step 652 and the sequence proceeds to decision step 654. If this is not the first time through the loop, the sequence branches directly to decision step 654 whereat the value of motor shaft velocity (M$_V$) calculated at step 518 of the sequence of FIG. 10 is compared to 0 to determine whether the shaft of motor 40 is rotating. If the motor shaft is not rotating (M$_V$=0), the sequence proceeds to process step 656 where the state variable for a test position of the shaft (SHAFT$_{TEST}$) is set equal to the shaft position (M$_P$) computed at step 512 of FIG. 10. If, however, at step 654 it is determined that the motor shaft is rotating, the sequence proceeds to decision step 658 to determine if spool 38 has rewound so far as to indicate breakage of tow 24. To this end, at step 658 the difference between the value of SHAFT$_{TEST}$ and M$_P$ is tested against the spool rewind limit (LIMIT), which, by way of example, is equal to the number of revolutions needed to rewind six feet of tow 24. If the shaft has rotated more than LIMIT, the sequence branches to process step 660 to raise an alert which will be used on the next pass through the sequence of FIG. 9 to shut down module 34 and stop motor 40 and to provide the alert status to CNC 120. If, however, spool 38 has rewound too much tow, the gross broken tow test has been passed and the fine broken tow test may be undertaken.

For the fine broken tow test, the radius of spool 38 is used. Hence, the sequence proceeds to decision step 662 whereat it is determined whether the radius of spool 38 has been computed. If it has not as yet been computed, the state variables (other than SHAFT$_{TEST}$) are cleared or reset at step 664. On the other hand, if R$_{SPOOL}$ has been computed, the sequence continues to step 666 to conduct the fine broken tow test which will now be described with reference to flow chart of FIG. 18.

The fine broken tow test, in essence, computes the linear tow distance moved by knowing the radius of the spool and the shaft position. That amount of tow movement is seen at the spool and is to be compared to the amount of tow movement expected as a result of the tow feed forward signals sent to tensioner module 34 from controller 120. As will be appreciated, the feed forward signals are representative of how tow 24 is to be moving out at application head 22. If the actual and expected tow movements do not agree, the tow may have broken or slipped under the restart roller of application head 22. The fine broken tow test now to be described detects such mismatches of even just a few inches. To this end, and referring to FIG. 18, at step 670, a first feed forward accumulated value (FF$_{ACC1}$) is set equal to its prior value plus the feed forward velocity (V$_{ROT}$). Then at process step 672, a first feed forward position value (FF$_{POS1}$) is computed equal to FF$_{ACC1}$ divided by a conversion constant (K$_{CONV1}$) to convert accumulated inches per minute to inches (K$_{CONV1}$=30). At process step 674, a first actual accumulated value (ACC$_1$) is computed equal to the sum of the prior first actual accumulated value plus the value of motor shaft position increment ($\Delta$ M$_P$) computed in the sequence of FIG. 10. At process step 676, the actual amount of shaft rotation (which is correlated to the amount of tow 24 payed out from spool 38) is computed according to the formula:

$$ACTPOS_1 = \frac{ACC_1 \cdot R_{SPOOL}}{K_{CONV2}} \quad (37)$$

where K$_{CONV2}$ is a constant to convert bits (where the computations are done in bits from resolver 172) to inches. The amount of tow slippage or differential (DIFF1) is then computed at step 678 equal to the absolute value of FF$_{POS1}$ minus the value of ACTPOS$_1$. Thereafter, at decision step 680, the value of ACTPOS$_1$ is tested to see if the desired amount of tow payout (referred to as TEST LENGTH) has occurred. Typically, the length of tow payout over which slippage is tested is, in one embodiment, 12 inches (i.e, TEST LENGTH=12 inch) after which a new 12 inch length will be tested. Hence, if the full 12 inches of tow payout has occurred, the sequence proceeds to process step 682 to clear the FF$_{ACC1}$ and ACC$_1$ variables. From step 680 or 682 as appropriate, the sequence may branch to decision step 684 to test whether tow 24 has slipped. To this end, at step 684, DIFF1 is compared to a predetermined value (K$_{SLIP}$) below which slippage is deemed acceptable or nonexistent, such as six inches. A value of K$_{SLIP}$ other than zero allows for the effects of various machines tolerances without indicating unacceptable slippage or tow breakage. If at step 684, too much tow slippage has occurred, the broken tow test variables are cleared and an alert is raised for use in shutting down module 34 and alerting CNC 120 at step 442 of the sequence of FIG. 9. Otherwise, the broken tow tests are completed and the sequence of FIG. 11 may continue to step 606. In a preferred embodiment, the tow slippage is not tested immediately at step 684. Rather, a second segment of tow 24 is also monitored for slippage by repeating steps 670-678 with variables subscripted "2" rather than "1" in steps 690-698 as seen in FIG. 18. The second segment of tow preferably overlaps the segment tested in the sequence of steps 670-682. Hence, at step 700, the value of ACTPOS$_2$ is tested against the value of TEST LENGTH$_2$ (rather than TEST LENGTH), which value is initially set to six inches, for example, so there will be an overlap between the DIFF1 and DIFF2 computations of 6 inches of tow.

If the second amount of tow test has elapsed, the sequence proceeds to decision step 702 to see whether the test is in the first six inches of tow payout or in subsequent lengths as will become apparent. Hence, ACTPOS$_2$ is compared to INITIAL LENGTH which in this embodiment is six inches and if they are equal, the sequence is still in first segment of tow 24 payout. To provide continuous overlap thereafter but with otherwise equal lengths of tow being tested (e.g., DIFF1 relates to x to x+12 inches and DIFF2 relates to x+6 to x+18 inches), the value of TEST LENGTH$_2$ is then set to the value of TEST LENGTH at process step 704. After either of steps 702 or 704, the sequence proceeds to process step 706 to clear the second segment variables (FF$_{ACC2}$ and ACC$_2$) and the sequence then proceeds to decision step 708 to begin the actual tow slippage test.

As two DIFF values are now possible for testing, only the larger need be tested. Hence, at decision step 708, the values of DIFF1 and DIFF2 are compared and the value of DIFF$_{TEST}$ is set equal to the larger of the two (or DIFF1 if they are equal) at process step 710 or 712 as will be apparent from the flow chart of FIG. 18. After DIFF$_{TEST}$ is selected, the slippage test is conducted at decision step 714 by comparing DIFF$_{TEST}$ to K$_{SLIP}$ as previously described for DIFF1 at optional step 684. If the test is affirmative, the variables, FF$_{ACC1}$, FF$_{ACC2}$, ACC$_1$ and ACC$_2$ are reset at process step 716 and the alert raised. The sequence then ends by proceeding to step 606 of the tension servo sequence. If the result of the test at step 714 is negative, the tow is still intact and has not slipped so the tension servo sequence of FIG. 11 may proceed as normal.

As previously mentioned, if module 34 is not to be in the active application mode, module 34 may be in the slack take-up mode which will now be described with reference to FIG. 12. For the slack take-up mode, relay 178 will have been placed into the low drive state at step 444 of the servo sequence (FIG. 9). The slack take-up mode also reconfigures the servo control into an essentially open loop control wherein the command to driver interface 176 is based upon a locally generated torque command from local processor 162 without error loop tension feedback control. The slack take-up mode of FIG. 12 may be used both at idle and prepatory to going into the active application mode to be sure adequate tension is built up on tow 24 before allowing full drive to be applied thereto. To this end, the slack take-up procedure proceeds to decision step 750 whereat it is determined whether CNC 120 has instructed module 34 to be in the active application mode. If the active application mode is requested, the tension on tow 24 will be evaluated and either the active application mode flag will ultimately be set true or an alert will issue.

More specifically, the sequence proceeds to process step 752 whereat a value of static torque ($T_{STAT}$) is set equal to a constant referred to as HIGH TORQUE which in a preferred embodiment corresponds to a value which will result in about 2.0 in-lbs of torque from motor 40. The sequence then proceeds to decision step 754 where it is determined whether a fixed time such as five (5) seconds has elapsed since the active application mode was requested. If that time has elapsed, then proper tension on tow 24 has not been established and the sequence branches to process step 756 to raise an alert. If, however, that time has not elapsed, then the sequence branches to decision step 758 whereat the shaft velocity ($M_V$) is evaluated to determine whether spool 38 has slowed down to a level, such as 10 RPM, to indicate that the slack is tightening up and the tow is coming under tension. If not, the sequence proceeds directly to decision step 760 and the active application mode flag is not yet set for use at decision step 410 of FIG. 9. If motor 40 has slowed down sufficiently, the value of actual tension ($T_A$) in tow 24 is then tested at decision step 762 to see if tow 24 is sufficiently tensioned to be fully driven such as at least 1 lb. If tow 24 is not sufficiently tensioned, the sequence again proceeds to decision step 760. If, however, tow 24 is under tension (and $M_V$ is moving slowly enough), then the active application mode may be entered at the next occurrence of process step 410 in the sequence of FIG. 9. Hence, at process step 764, the active application mode flag is set.

After a negative response at one of steps 750, 758 or 762, or after setting the flag at step 764, the remainder of the slack take-up procedure is begun. To this end, the sequence proceeds to decision step 760 whereat it is determined whether this is the first pass through the sequence of FIG. 12, i.e., has module 34 just entered the slack take-up mode. If not, a VEL command is computed at step 770 equal to the product of $M_V$ and a velocity scale constant ($K_{VS}$) dependent on viscous friction of the drive system for spool 38. In a preferred embodiment, $K_{VS}=400$. At step 772, an output command (TC) is computed equal to the sum of VEL and $T_{STAT}$. The output command is now a torque command which is generated in a pseudo-closed loop by which to keep tension on tow 24 somewhat constant by virtue of the adjustment of VEL to accommodate viscous friction effects.

Figure 12:
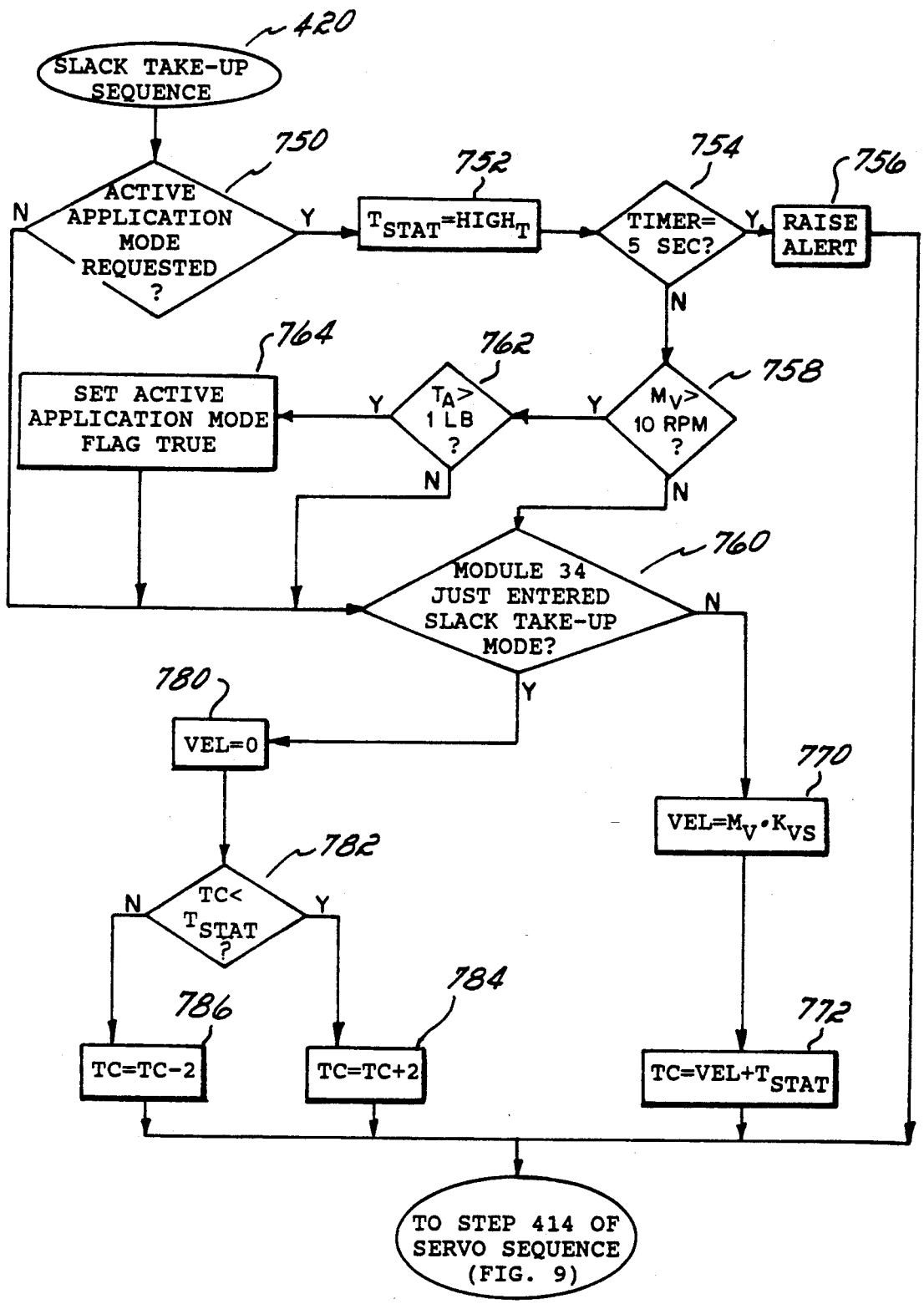

Returning to step 760, if this is the first pass through the sequence of FIG. 12, such as after switching from active application mode to the slack take-up or safety mode, the motor drive 168 has been disconnected from the high voltage power supply 190 and is now connected to the low voltage power supply 194. In order to keep the tension on the tow somewhat constant during the transition, the torque command is preferably ramped from the prior TC command towards the value of static torque ($T_{STAT}$). To this end, the sequence branches to process step 780 whereat VEL is set equal to zero and then to decision step 782 whereat the current output command (TC) is compared to the value of $T_{STAT}$. If TC is less than $T_{STAT}$, the sequence proceeds to process step 784 to increment the magnitude of TC. Otherwise, the sequence proceeds to process step 786 to decrement the value of TC. Thereafter, the sequence proceeds to step 414 of FIG. 9 where the state of the first pass flag is changed as previously described.

As will be appreciated from the foregoing, in the slack take-up mode, the tension on tow 24 is not monitored to close a tension feedback loop. Hence, tension control is primarily open loop with a pseudo-closed loop aspect related to velocity control so as to adjust the torque from motor 40. As will further be appreciated, however, in the slack take-up mode, the tow is kept under enough tension to be held in the guidance structure rollers but low enough to be safely handled by an operator.

Even before entering the slack take-up mode from the active application mode, the torque from motor 40 is preferably to be ramped to a desirably safe value taking into account the transition which is occurring in the power supply as discussed above. Hence, the ramping of FIG. 12 is in reality the final step of adjusting that torque whereas a more involved transition servo procedure will occur until local processor 162 determines that the slack take-up mode may finally be undertaken. To this end, reference is made to the flow chart of FIG. 13 depicting the transition servo procedure of step 424 of FIG. 9.

Beginning at decision step 800, it is determined whether the current pass through the transition servo sequence is the first or a subsequent pass. If it is determined that this is the first pass, a final output value ($TC_F$) is computed at process step 802 equal to a fixed tension value $K_{TF}$ such as two pounds times $R_{SPOOL}$ and divided by the output unit conversion constant $K_O$. If this is not the first pass, or after performing process step 802, the sequence proceeds to decision step 804 whereat it is determined whether the desired transition has been accomplished. To this end, at decision step 804, if the absolute value of $(TC - TC_{FF})$ is less than an upper limit of differential such as 0.1 in-lbs, then the transition is completed. The sequence thus branches to process step 806 to set $TC = TC_{FF}$ for the final transition prior to entering the slack take-up mode. At step 808, a slack-take-up-mode-request flag is then set true to allow the slack-take-up-mode flag to be set true and relay 178 placed in the low drive mode upon performing process step 440 in a subsequent pass through the sequence of FIG. 9 such that the slack-take-up sequence may then be undertaken.

If the transition process is not yet complete at step 804, the sequence proceeds to decision step 810 wherein the current value of TC is compared directly to the value of $TC_{FF}$ and TC decremented or incremented at process steps 812 or 814, respectively, depending upon whether TC is or is not greater than $TC_{FF}$. After performing one of steps 808, 812 or 814, the sequence of FIG. 13 ends followed by step 414 of the servo sequence of FIG. 9. In the event it is desired to stop motor 40, such as to thread a tow, in an alert condition or even to unchuck spool 38, it is preferable to ramp motor 40 to a stop rather than simply shutting down the drive thereto. To this end, there is provided the motor stop sequence of step 428 which will now be described with reference to FIG. 14. At decision step 820, it is determined whether this is the first pass through the sequence of FIG. 14. If so, the sequence proceeds to step 822 to set a drive output zero flag ($I_{DO}$) and a motor at rest flag ($I_{MR}$), both false. If this is not the first pass, or after step 822, the sequence proceeds to decision step 824 wherein it is determined whether the absolute value of the output command TC is sufficiently small (such as 0.1 in-lb) to effectively and safely stop motor 40 with a zero output command value for TC. If so, the sequence branches to process step 826 to set TC equal to 0 and change the state of $I_{DO}$ to TRUE. Otherwise, the sequence proceeds to decision step 828 to determined whether TC is a positive or negative value. The value of TC is then incremented or decremented toward zero at process step 830 or process step 832, respectively.

After performing one of process steps 826, 830, and-/or 832, the sequence of FIG. 14 then proceeds to decision step 834 wherein the motor shaft speed ($M_V$) is evaluated to see if it is rotating slowly enough (e.g., less than 10 RPM) to come to rest within a short period of time (such as ½ sec). If $M_V$ is still too large, a counter value (CT) is set equal to zero and $I_{MR}$ is set FALSE at process step 836. However, if $M_V$ is small enough, the sequence proceeds to count 250 passes through the sequence of FIG. 14 (i.e., 500 ms or ½ sec) by testing the value of CT against 250 at decision step 838. If the requisite number of passes (or length of time) has not yet occurred, CT is incremented at process step 840. Otherwise the sequence branches to process step 842 where CT is set equal to 0 and $I_{MR}$ is set TRUE as the motor is assumed to have come to a stand still. Although not shown in FIG. 9, if spool 38 is to be unchucked such as at step 438, the $I_{DO}$ and $I_{MR}$ flags must be true or the sequence will proceed as previously described to step 428 to begin the motor stop sequence of FIG. 14.

In the operation of machine 10 in the active application mode, controller 120 will repeatedly generate change in position command signals by which to cause fiber placement head 22 to move and apply fiber tows to mandrel 26. With each newly generated change in position command signal, information related to the expected change in length of tows 24 in the Q- and U-axes, the change (RRC) due to the spatial relationship change of the redirect rollers, and the status of solenoids 56, 58 affecting movement in the Q- and U-axes will be computed so as to provide tensioner modules 34 with advance information regarding tow movement by which to adjust the tension commands (TC) to anticipate such movement. Thus, in accordance with the principles of the present invention, there is included in addition to a closed loop tension control, a tow velocity feed forward component to anticipate tow movement due to motion or function of head 22. In accordance with a further aspect of the present invention, a compliant roller is provided for each tow so as to in effect "absorb" tension dips and spikes due to disturbances on the tow thereby allowing for better tension control. As the compliant roller is significantly less stiff than the tow (e.g., 8 lbs/in vs 64 lbs/in), the overall stiffness of the tensioner system is now dominated by the springs of the compliant roller and is generally independent of variation in tow stiffness of different materials. Consequently, accurate servo control of tension with modules 34 is generally obtained with little sensitivity to the different tow materials that might be encountered.

By virtue of the foregoing, use of the feed forward component in the tensioner servo control and use of the compliant roller greatly reduces tension error or fluctuation due to various tow disturbances normally encountered in operation of tension controlled fiber placement system. In accordance with a yet further aspect of the present invention, the advantages of the compliant roller are obtained without drawbacks which might occur by including, in the active application mode, an inner velocity closed loop that more effectively controls the tension on tow 24 by more directly controlling motor shaft velocity.

Still further, the feed forward and inner velocity loop signals must be correlated to actual tow movement. Hence, as described above, shaft velocity is modified in relation to the spool diameter so as to effectively schedule the various loop gains and relative magnitude of the signals to match actual tow payout characteristics.

In accordance with still further aspects of the present invention, while a fiber tow is being payed out to be applied to the mandrel, the amount of actual tow payout sensed by the sensors communicating with the tensioner module is continuously evaluated against the expected amount of tow payout from the feed forward signals to determine whether the tow has slipped thus detecting the possibility of an impending failure of machine 10 such as a break in tow 24 or defect in the part being made either prior to the failure or defect actually occurring or immediately upon its occurrence. As a consequence, repairs may be effected immediately and the part saved rather than being discarded thereby enhancing productivity and reliability. When any module 34 is to enter the slack take-up mode either from the active application mode or the threading mode, for example, the servo control for that tow is configured in a low power state and an open tension loop for torque commands to the motor to slowly reel up slack and/or hold slight tension (e.g., 1 lb) on the tow irrespective of the mode of any other module 34. To maintain the tension, the actual motor shaft velocity is monitored and utilized to generate a component of the open loop torque command to provide pseudo-closed loop operation.

While the present invention has been illustrated by description of alternative embodiments and while the alternative embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of Applicant's general inventive concept.

TABLE I

| Item | Matrix | Solution |
|---|---|---|
| | BFRAME = | $\begin{bmatrix} B_{11} & B_{12} & B_{13} & B_{14} \\ B_{21} & B_{22} & B_{23} & B_{24} \\ B_{31} & B_{32} & B_{33} & B_{34} \\ 0 & 0 & 0 & 1 \end{bmatrix}$ |
| (10) | BFRAME' = | $\begin{bmatrix} B_{11}' & B_{12}' & B_{13}' & B_{14}' \\ B_{21}' & B_{22}' & B_{23}' & B_{24}' \\ B_{31}' & B_{32}' & B_{33}' & B_{34}' \\ 0 & 0 & 0 & 1 \end{bmatrix}$ |
| (11) | CFRAME = | $\begin{bmatrix} B_{11}'\cos WT - B_{13}'\sin WT & B_{12}' & B_{11}'\sin WT + B_{13}'\cos WT & B_{14}' + RD_H(B_{11}'\sin WT + B_{13}'\cos WT) \\ B_{21}'\cos WT - B_{23}'\sin WT & B_{22}' & B_{21}'\sin WT + B_{23}'\cos WT & B_{24}' + RD_H(B_{21}'\sin WT + B_{23}'\cos WT) \\ B_{31}'\cos WT - B_{33}'\sin WT & B_{32}' & B_{31}'\sin WT + B_{33}'\cos WT & B_{34}' + RD_H(B_{31}'\sin WT + B_{33}'\cos WT) \\ 0 & 0 & 0 & 1 \end{bmatrix}$ |
| (12) | EFRAME' = | $\begin{bmatrix} E_{11}' & E_{12}' & E_{13}' & E_{14}' \\ E_{21}' & E_{22}' & E_{23}' & E_{24}' \\ E_{31}' & E_{32}' & E_{33}' & E_{34}' \\ 0 & 0 & 0 & 1 \end{bmatrix}$ |
| (15) | BROT = | $\begin{bmatrix} B_{11} & B_{12}\cos BT + B_{13}\sin BT & -B_{12}\sin BT + B_{13}\cos BT & B_{14} \\ B_{21} & B_{22}\cos BT + B_{23}\sin BT & -B_{22}\sin BT + B_{23}\cos BT & B_{24} \\ B_{31} & B_{32}\cos BT + B_{33}\sin BT & -B_{32}\sin BT + B_{33}\cos BT & B_{34} \\ 0 & 0 & 0 & 1 \end{bmatrix}$ |
| (16) | EROT = | $\begin{bmatrix} E_{11} & E_{12}\cos BC + E_{13}\sin BC & -E_{12}\sin BC + E_{13}\cos BC & E_{14} \\ E_{21} & E_{22}\cos BC + E_{23}\sin BC & -E_{22}\sin BC + E_{23}\cos BC & E_{24} \\ E_{31} & E_{32}\cos BC + E_{33}\sin BC & -E_{32}\sin BC + E_{33}\cos BC & E_{34} \\ 0 & 0 & 0 & 1 \end{bmatrix}$ |

What is claimed is:

1. A fiber placement apparatus comprising:
   a creel;
   rotatable means associated with the creel for rotatably supporting a spool of fiber tow;
   head means movable relative the creel for applying the fiber tow to a mandrel surface;
   means for generating a setpoint signal corresponding to desired tension on the fiber tow;
   tension sensor means for generating an actual tension signal corresponding to tension on the fiber tow;
   reconfigurable servo control means having at least an active application mode and a slack take-up mode for generating a command signal, the rotatable means being responsive to the command signal whereby to cause the spool to rotate, the servo control means including:
   error means for generating a tension error signal correlated to the difference between the setpoint and the actual tension signal; and
   generating means for generating the command signal; and
   means for configuring the servo control means to make the generator means selectively responsive to the error means such that
   (i) in the active application mode, the command signal is correlated to at least the tension error signal whereby to provide closed tension loop servo control of spool rotation; and
   (ii) in the slack take-up mode, the command signal is generated irrespective of the tension error signal whereby to provide open tension loop servo control of spool rotation.

2. The apparatus of claim 1 further comprising means for generating a feed forward signal corresponding to expected movement of the fiber tow, the generator means being further responsive to the feed forward signal in the active application mode such that the command signal is further correlated to the feed forward signal in the active application mode.

3. The apparatus of claim 2 further comprising:
   tow motion means for generating a tow motion signal indicative of fiber tow movement;
   the servo control means including means responsive to the tow motion signal and the feed forward signal for indicating slippage of the fiber tow.

4. The apparatus of claim 1 further comprising:
means for generating a motor signal corresponding to rotation of the spool;
the servo control means further including radius means responsive to the motor signal for generating a radius signal corresponding to radius of the spool, the generator means being further responsive to the radius signal in the active application mode such that the command signal is further correlated to the radius signal in the active application mode.

5. The apparatus of claim 4, the servo control means further including means responsive to the motor signal for generating a velocity signal corresponding to rotational velocity of the spool, the generator means being further responsive to the velocity signal such that the command signal is further correlated to the velocity signal in each of the active and slack take-up modes.

6. The apparatus of claim 1 further comprising:
high voltage power supply means;
low voltage power supply means; and
means for connecting the generator means to (a) the high voltage power supply means in the active application mode of the servo control for full powered operation of the rotatable means, and (b) the low voltage power supply means in the slack take-up mode of the servo control whereby to limit operation of the rotatable means.

7. A fiber placement apparatus comprising:
a creel;
rotatable means associated with the creel for rotatably supporting a spool of fiber tow;
head means movable relative the creel for applying the fiber tow to a surface such that a variable length fiber path to be traversed by the fiber tow is defined between the head means and the rotatable means;
means for generating a setpoint signal corresponding to desired tension on the fiber tow and a feed forward signal corresponding to expected movement of the fiber tow including change in length of the fiber path between the rotatable means and the head means as the head means move relative the creel; and
servo control means for generating a command signal correlated to at least the setpoint and feed forward signals, the rotatable means being responsive to the command signal such that the spool is caused to rotate so as to seek to achieve and maintain the desired tension on the fiber tow.

8. The apparatus of claim 7 further comprising:
tension sensor means for generating an actual tension signal corresponding to tension on the fiber tow;
the servo control means including:
means for generating a tension error signal correlated to the difference between the setpoint and actual tension signals; and
means for generating the command signal correlated to at least the feed forward signal and the tension error signal whereby to provide closed tension loop servo control of spool rotation.

9. The apparatus of claim 7 further comprising:
means for generating a motor signal corresponding to rotation of the spool;
the servo control means including:
radius means responsive to at least the motor signal for generating a signal corresponding to radius of the spool; and
means for generating the command signal correlated to at least the setpoint, feed forward and radius signals whereby to provide gain scheduling to account for changes in spool radius.

10. The apparatus of claim 7 further comprising:
tension sensor means for generating an actual tension signal corresponding to tension on the fiber tow;
means for generating a motor signal corresponding to rotation of the spool;
the servo control means including:
radius means responsive to at least the motor signal for generating a radius signal corresponding to radius of the spool;
means for generating a tension error signal correlated to the difference between the setpoint and actual tension signals; and
means for generating the command signal correlated to at least the feed forward, tension error and radius signals, whereby to provide closed loop tension control of spool rotation and gain scheduling to account for changes in spool radius.

11. The apparatus of claim 7 further comprising:
means for generating a motor signal corresponding to rotation of the spool;
the servo control means including:
means responsive to the motor signal for generating a velocity signal corresponding to rotational velocity of the spool; and
means for generating the command signal correlated to at least the feed forward, setpoint and velocity signals whereby to provide tension control with an inner velocity loop.

12. The apparatus of claim 7 further comprising:
tension sensor means for generating an actual tension signal corresponding to tension on the fiber tow;
means for generating a motor signal corresponding to rotation of the spool;
the servo control means including:
means responsive to the motor signal for generating a velocity signal corresponding to rotational velocity of the spool;
means for generating a tension error signal correlated to the difference between the setpoint and tension signals; and
means for generating the command signal correlated to at least the feed forward, tension error and velocity signals whereby to provide closed tension loop control with an inner velocity loop.

13. The apparatus of claim 7 further comprising:
tow motion means for generating a tow motion signal indicative of fiber tow movement;
means responsive to the tow motion signal and the feed forward signal for indicating slippage of the fiber tow.

14. The apparatus of claim 7 further comprising:
guidance structure means for guiding the tow from the rotatable means to the head means, the guidance structure means including compliant roller means for smoothing tension changes on the fiber tow whereby to maintain tension control despite disturbances to the fiber tow.

15. The apparatus of claim 7 further comprising:
high voltage power supply means;
low voltage power supply means; and
means for selectively connecting the rotatable means to one of (i) the high voltage power supply means for full power operation of the rotatable means and (ii) the low voltage power supply means as a safety whereby to limit operation of the rotatable means.

16. A fiber placement apparats comprising:

a creel;

rotatable means associated with the creel for rotatably supporting a spool of fiber tow;

head means movable relative the creel for applying the fiber tow to a surface such that a variable length fiber path to be traversed by the fiber tow is defined between the head means and the rotatable means;

guidance structure means for guiding the fiber tow along the fiber path from the rotatable means to the head means;

means for generating tension signals corresponding to desired tension on the fiber tow taking into account change in length of the fiber path between the head means and the rotatable means as the head means moves relative the creel;

means for generating motor signals corresponding to rotation of the spool; and control means for generating command signals correlated to the motor and tension signals, the rotatable means being responsive to the command signals such that the spool is caused to rotate so as to seek to achieve and maintain the desired tension;

the guidance structure means including compliant roller means for smoothing tension changes on the fiber tow as the fiber tow is applied whereby to maintain tension control despite disturbances to the fiber tow.

17. The apparatus of claim 15 further comprising:

high voltage power supply means;

low voltage power supply means; and means for selectively connecting the rotatable means to one of (i) the high voltage power supply means for full power operation of the rotatable means and (ii) the low voltage power supply means as a safety whereby to limit operation of the rotatable means.

18. A fiber placement apparatus comprising:

a creel;

rotatable means associated with the creel for rotatably supporting a spool of fiber tow;

head means movable relative the creel for applying the fiber tow to a surface such that a variable length fiber path to be traversed by the fiber tow is defined between the head means and the rotatable means;

means for generating a setpoint signal corresponding to desired tension on the fiber tow and a feed forward signal corresponding to movement of the fiber tow including change in length of the fiber path between the rotatable means and the head means as the head means moves relative the creel;

tension control means for generating a command signal correlated to at least the setpoint signal whereby to cause the spool to rotate so as to seek to achieve and maintain the desired tension;

tow motion means for generating a tow motion signal indicative of fiber tow movement; and slippage means responsive to the tow motion and feed forward signals for indicating slippage of the fiber tow.

19. The apparatus of claim 17, the slippage means including:

means responsive to the tow motion signal for determining extent of tow motion; and means for indicating slippage of the fiber tow when the extent of tow motion exceeds the magnitude of the feed forward signal by more than a predetermined amount. (ii) the low voltage power supply means as a safety whereby to limit operation of the rotatable means.

20. The apparatus of claim 17 further comprising:

high voltage power supply means;

low voltage power supply means; and means for selectively connecting the rotatable means to one of (i) the high voltage power supply means for full power operation of the rotatable means and (ii) the low voltage power supply means as a safety whereby to limit operation of the rotatable means.

* * * * *

UNITED STATES PATENT AND TRADEMARK OFFICE
CERTIFICATE OF CORRECTION

PATENT NO. : 5,223,072

DATED : June 29, 1993

INVENTOR(S) : John Brockman, Robert Carman, David C. Swope, Norman D. Neal and Harold D. Wiebe It is certified that error appears in the above-identified patent and that said Letters Patent is hereby corrected as shown below:

Column 37, line 53, delete "mandrel".

Column 41, line 3, "apparats" should read --apparatus--.

Column 41, line 32, "claim 15" should read --claim 16--.

Column 42, line 23, "claim 17" should read --claim 18--.

Column 42, line 30, delete "(ii) the low voltage power supply means as a safety whereby to limit operation of the rotatable means."

Column 42, line 33, "claim 17" should read --claim 18--.

Signed and Sealed this

Sixteenth Day of August, 1994

Attest:

BRUCE LEHMAN

*Attesting Officer*  *Commissioner of Patents and Trademarks*